US009847921B2

(12) United States Patent
Janky et al.

(10) Patent No.: US 9,847,921 B2
(45) Date of Patent: Dec. 19, 2017

(54) METHOD AND APPARATUS FOR TESTING AND DISPLAYING TEST RESULTS

(71) Applicant: Fluke Corporation, Everett, WA (US)

(72) Inventors: Sena E. Janky, Sammamish, WA (US); Glenn Keltto, Everett, WA (US); Steve O'Hara, Everett, WA (US); J. David Schell, Austin, TX (US); Elizabeth Bacon, Everett, WA (US); Karen Jones, Everett, WA (US)

(73) Assignee: Fluke Corporation, Everett, WA (US)

( * ) Notice: Subject to any disclaimer, the term of this patent is extended or adjusted under 35 U.S.C. 154(b) by 92 days.

(21) Appl. No.: 14/739,855

(22) Filed: Jun. 15, 2015

(65) Prior Publication Data
US 2015/0281024 A1    Oct. 1, 2015

Related U.S. Application Data

(63) Continuation of application No. 13/372,374, filed on Feb. 13, 2012, now Pat. No. 9,077,646.

(51) Int. Cl.
*H04L 12/26*    (2006.01)
*H04L 12/24*    (2006.01)
*H04B 10/071*   (2013.01)

(52) U.S. Cl.
CPC ....... *H04L 43/0817* (2013.01); *H04B 10/071* (2013.01); *H04L 41/22* (2013.01); *H04L 43/50* (2013.01)

(58) Field of Classification Search
None
See application file for complete search history.

(56) References Cited

U.S. PATENT DOCUMENTS

| | | | | |
|---|---|---|---|---|
| 5,228,072 A | * | 7/1993 | Ingalsbe | G01R 31/021 324/540 |
| 5,629,628 A | * | 5/1997 | Hinds | G01R 31/021 324/539 |
| 5,680,326 A | * | 10/1997 | Russ | H04L 41/0654 709/239 |
| 7,337,431 B1 | | 2/2008 | Barnes et al. | |
| 7,804,784 B1 | * | 9/2010 | Lo | H04L 12/2697 370/251 |
| 2003/0098879 A1 | | 5/2003 | Mathews | |

(Continued)

FOREIGN PATENT DOCUMENTS

| | | |
|---|---|---|
| CN | 101847227 | 9/2010 |
| JP | 2006331224 | 12/2006 |
| WO | WO-2007052665 | 4/2009 |

OTHER PUBLICATIONS

Office Action for Japanese Patent Application No. JP2013-025082, dated Nov. 22, 2016.

(Continued)

*Primary Examiner* — Hong Cho
(74) *Attorney, Agent, or Firm* — Locke Lord LLP; Scott D. Wofsy; Christopher J. Capelli

(57) ABSTRACT

A test instrument provides suggested next operational step function to provide a user with assistance during testing. A display is provided to show the amount of a project that has been completed, for example as a percentage completed value. Individual test results may be saved to a "fix later" list, which may be later accessed to re-test items that may not have passed on initial testing.

19 Claims, 27 Drawing Sheets

(56) References Cited

U.S. PATENT DOCUMENTS

| | | | |
|---|---|---|---|
| 2003/0194672 A1* | 10/2003 | Roberts | G01R 31/007 |
| | | | 431/196 |
| 2004/0168111 A1* | 8/2004 | Arnold | G06F 11/3664 |
| | | | 714/57 |
| 2005/0114500 A1* | 5/2005 | Monk | H04L 12/2602 |
| | | | 709/224 |
| 2005/0288946 A1* | 12/2005 | Vogel | H02G 3/00 |
| | | | 702/117 |
| 2007/0047448 A1 | 3/2007 | Chiu et al. | |
| 2007/0052665 A1 | 3/2007 | Zhou et al. | |
| 2008/0086278 A1 | 4/2008 | Nakayama et al. | |
| 2011/0314344 A1* | 12/2011 | Okamoto | H04L 43/50 |
| | | | 714/46 |
| 2012/0016618 A1* | 1/2012 | Astigarraga | G01R 31/021 |
| | | | 702/109 |

OTHER PUBLICATIONS

Extended European Search Report for European Patent Application 13154791.1, dated Feb. 24, 2017.
Office Action from IP Australia for Australian Patent Application No. 2013200764, dated Jun. 30, 2107.
The First Office Action from the State Intellectual Property Office of the People's Republic of China for Chinese Patent Application No. 201310180098.9, dated May 18, 2017.

* cited by examiner

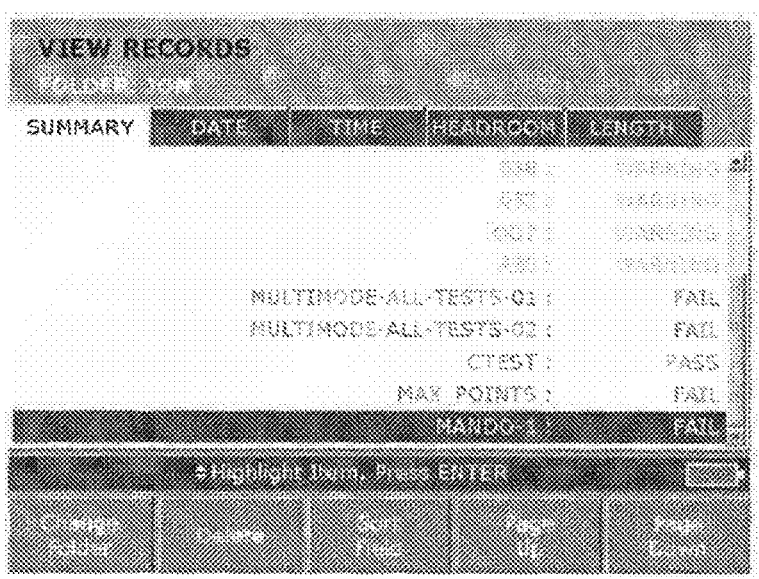
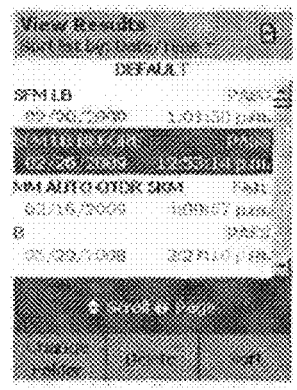
FIG. 6 (PRIOR ART)
FIG. 7 (PRIOR ART)

FIG. 13

METHOD AND APPARATUS FOR TESTING AND DISPLAYING TEST RESULTS

CROSS REFERENCE TO RELATED APPLICATION

This application is a Continuation of co-pending U.S. application Ser. No. 13/372,374 filed Feb. 13, 2012, which is incorporated herein by reference in its entirety.

BACKGROUND OF THE INVENTION

This disclosure relates to test and measurement, and more particularly to a method and apparatus for performing testing and displaying test results from testing.

When making test measurements on computer networks, for example, in setup and testing of installations with large numbers of network cables, testing must be performed to ensure that the various network cabling is fully functional, whether copper wire based network cable, fiber optic network cable, or wireless networks. Large installations can comprise hundreds or more cables needing testing. Accordingly, tracking the testing process becomes important, to allow efficient testing and use of the technician's time.

A test instrument may include the ability to save test results, for documentation and proving of the network installation. However, it has been noted that there can be a psychological barrier to saving results from failed tests, as technicians would prefer co have all their test results show passing. So, a technician may decline to save negative results, preferring instead to come back later to test again, perhaps after making some corrective adjustment to the network cables. Such action can reduce efficiency in the test operation, and can also result in missing items that might need to be corrected.

The operation of network test instruments can require a level of technical expertise, with multiple options and test suites being available, such that technicians with lesser experience may be confused as to what test or measurement to perform in a particular situation. It is desirable to have technicians with less experience performing the bulk of testing, saving the more experienced technicians' time for working on particularly difficult issues or for correcting network cabling that does not pass initial testing.

FIGS. 2-7 illustrate prior art display screens, wherein FIGS. 2 and 3 represent starting screens where testing is initiated. FIGS. 4 and 5 represent 2 different types of summary of test information screens, FIG. 2 representing a failed test and FIG. 3 representing a passed test. FIGS. 6 and 7 represent screens for viewing test results.

In FIG. 8, a prior art representation of a tested cable is shown. While individual cable segments are shown, viewing test results from any particular individual cable segment requires moving to a different display screen, scrolling through results until the particular segment of interest is located.

SUMMARY OF THE INVENTION

In accordance with the invention, an improved display method and device is provided for operating a network test instrument and for displaying test results from network testing.

Accordingly, it is an object of the present disclosure to provide an improved network test instrument.

It is a further object of the present disclosure to provide an improved network test instrument that provides easy tracking of project status.

It is yet another object of the present disclosure to provide an improved network test instrument and method that provides a measure of the project completion.

It is yet another object of the present disclosure to provide an improved network test instrument and method that provides a suggested next operational step to be performed.

It is yet another object of the present disclosure to provide an improved network test instrument and method that provides an option to mark a test item to be re-tested later.

The subject matter of the present display method and apparatus is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIGS. 2-8 are example of prior art displays provided by test instruments;
FIG. 13 is a 'test setup' page display.

DETAILED DESCRIPTIONS

The system according to a preferred embodiment of the present disclosure comprises a method and apparatus for testing networks.

The method and apparatus provides an easy to use test instrument which provides suggested next operational step information no a user, provides the ability to display a percentage of a project that has been completed, and provides the ability to save test results to a 'fix later' list or to immediately test again, eliminating a user's predisposition against saving failed results, but still providing tracking of failure tests. A percentage of project completed amount is displayed to give easy review of the overall amount of a project that has been completed, so a technician or manager immediately can see how much of a project is complete and how much work is left to do. The overall pass and fail rate is displayed, suitably in the form of providing the number of passed, failed or marginally passed test items. When reviewing results, any failed, test results are moved to the top of the list, which thereby provides a 'punch list' of results that need to be addressed, eliminating the need to search through an entire list of test results to sort out the failed items from the passed items. A suggested next operational seep option is provided at many points during operation of the instrument, for example in the form of a highlighted next option choice, to provide the technician using the device with a 'what should I do next' operational assistance.

Figure 9:
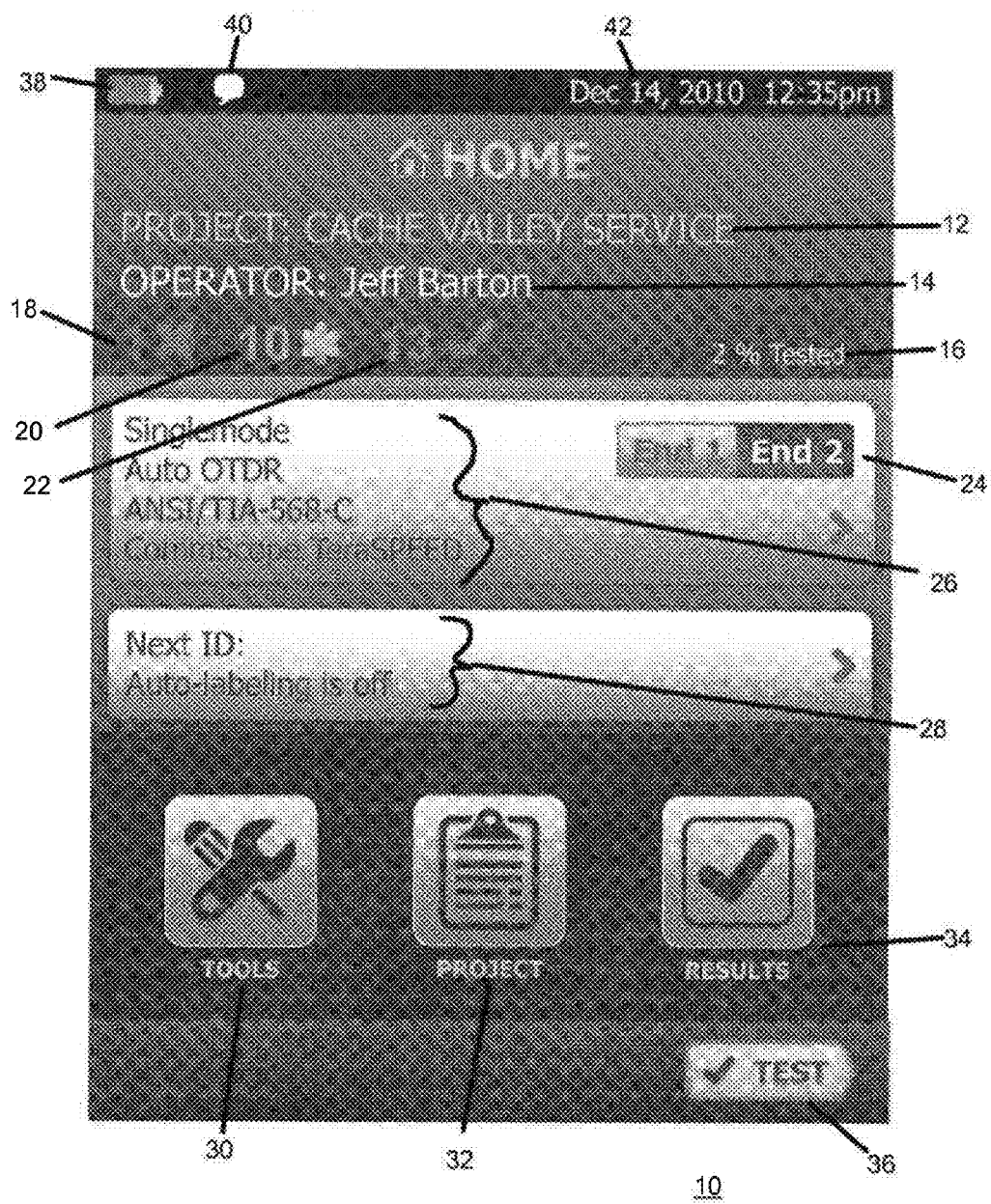
FIG. 9 is a home screen view in accordance with the disclosure.

FIG. 9 illustrates a hose screen in accordance with the disclosure, wherein a screen 10, which is suitably a touch screen project name 12 may be displayed, along with an operator's name 14. A percentage tested value is displayed at 16, representing, for example, the percentage of network cables in a particular project that nave been tested and/or passed testing.

In the example, a value of failed test items is shown at 18 (1×), suitably displayed in a color such as red, for example, while optionally, a value 20 shows 10 items that marginally passed the testing, suitably displayed in another color, such as orange. Value 22 shows in the illustration that 13 items have passed testing so far, suitably displayed in yet another color, such as green. An indicator at 24 denotes which end of the cable the results are pertaining to, while displayed values at 26 give various indications of the type of testing being performed. In the illustration, an optical test instrument is shown, with a singlemode auto OTDR testing, ANSI/TIA-568-C standards testing, with a CommScope TeraSPEED type fiber being tested.

A display region 28 provides the ability to display a Next ID field (to indicate the next item to be displayed or tested) and a status, such as "Auto-labeling if off".

Tools icon 30 provides access to a tools screen or screens, Project icon 32 provides access to screens for reviewing or editing project information, and Results icon 34 provides access to results screens for viewing and editing test results information.

An icon 35 provided at the lower right corner of the screen displays a suggested next operational step for the technician using the instrument to take. In the particular view of FIG. 9, the suggested, next operational step is 'TEST' indicating that the instrument is suggesting that, testing be performed. The icon 36 is suitably displayed in a color, such as yellow in a particular embodiment, to distinguish it from other icons on the screen and fit a color theme for 'next operational step to take'.

Additional information may be provided on the screen, such as a battery status indicator 38, chat icon 40, which, opens a voice or text communication screen, and current date/time indication 42.

Figure 10:
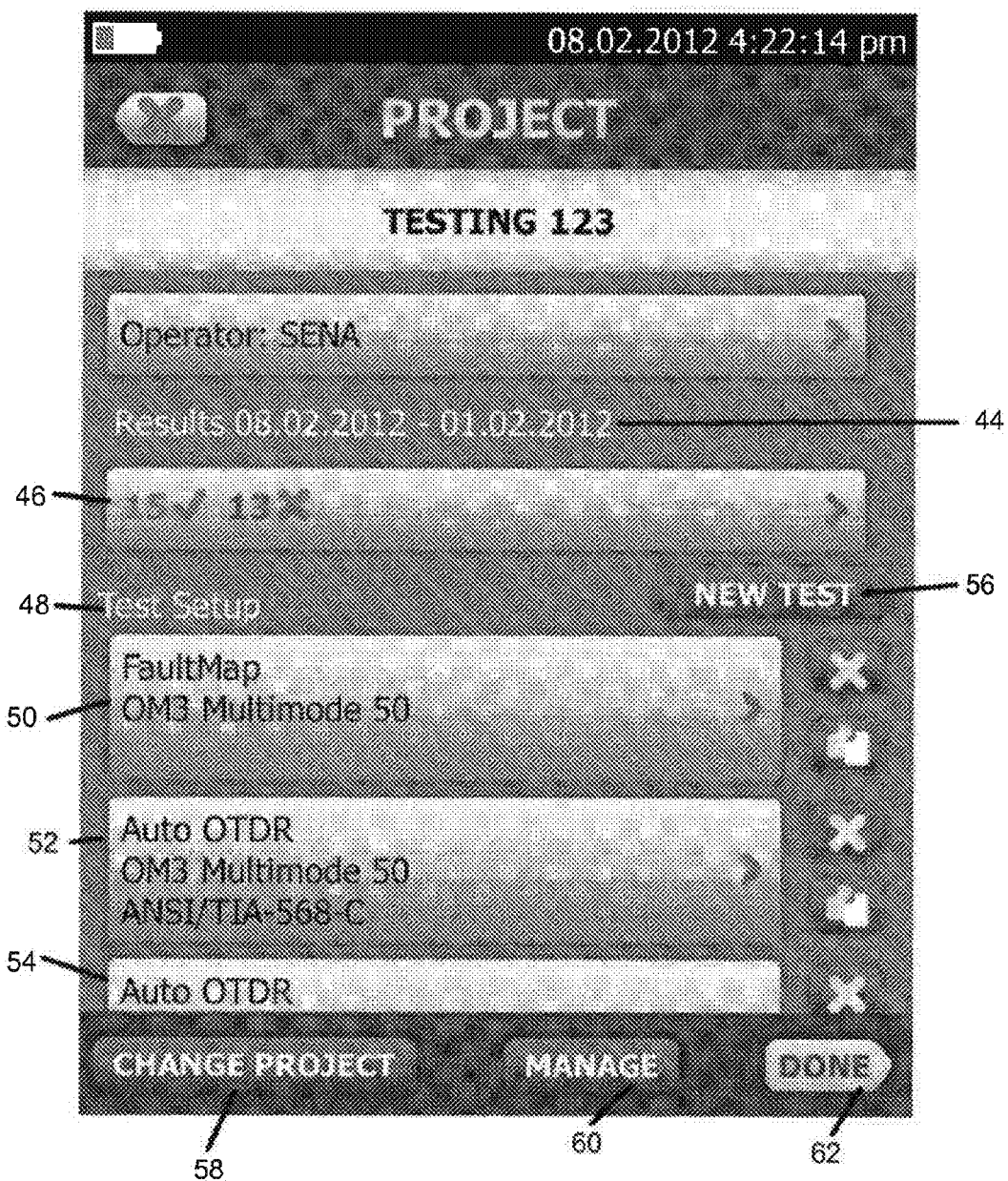
FIG. 10 is a project page display.
Figure 11:
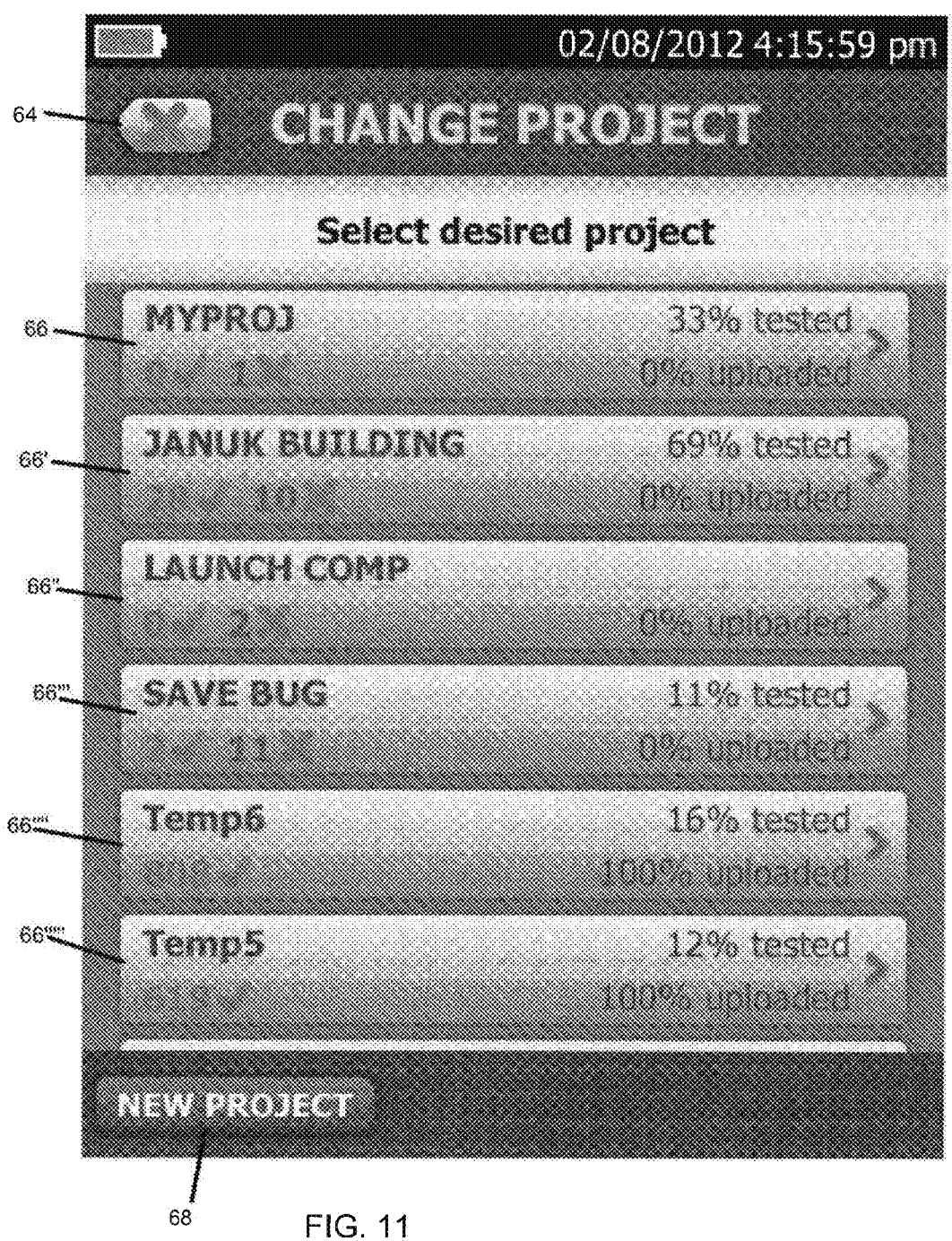
FIG. 11 is a 'change project' page display.
Figure 12:
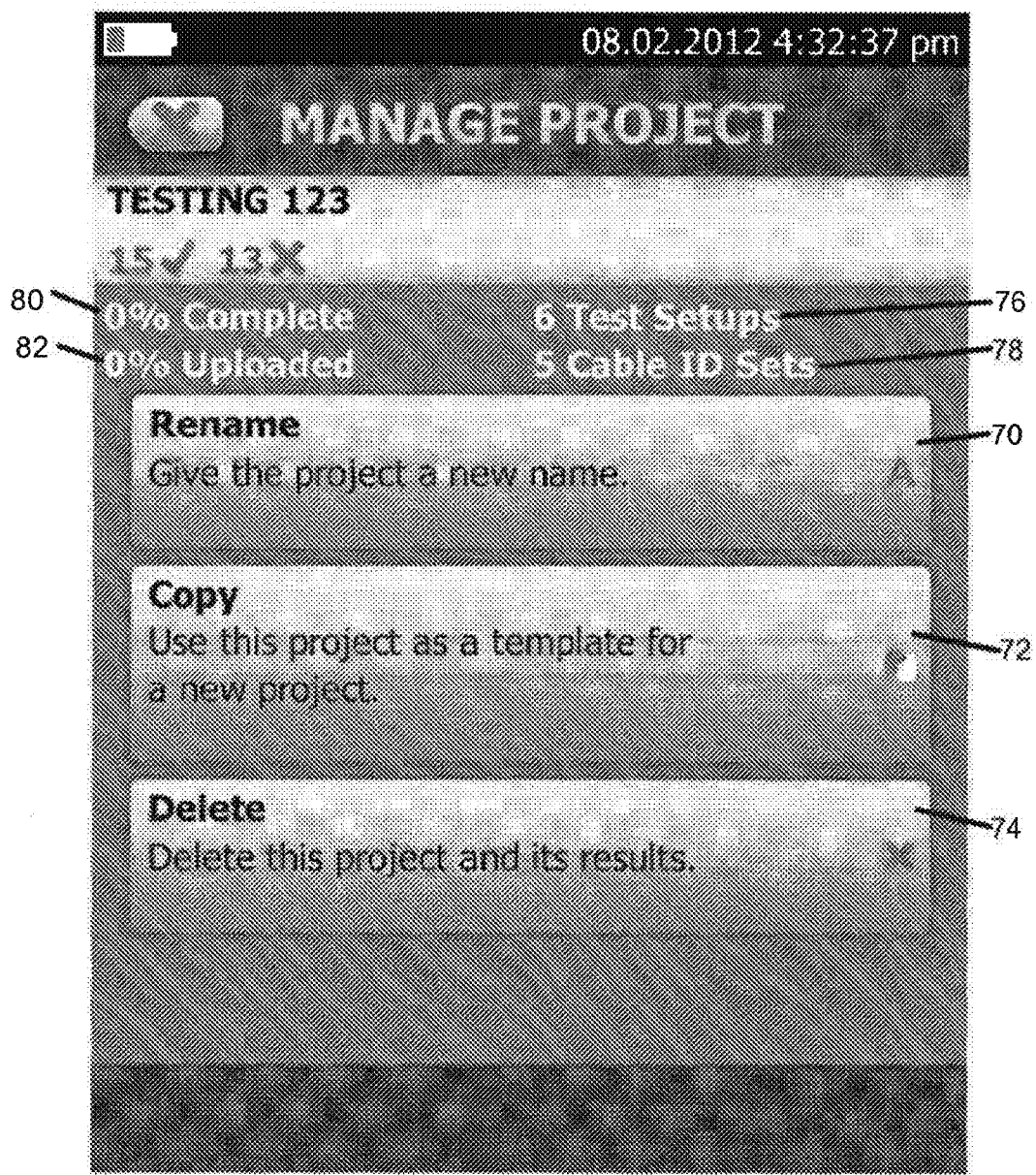
FIG. 12 is a 'manage project' page display.
Figure 31:
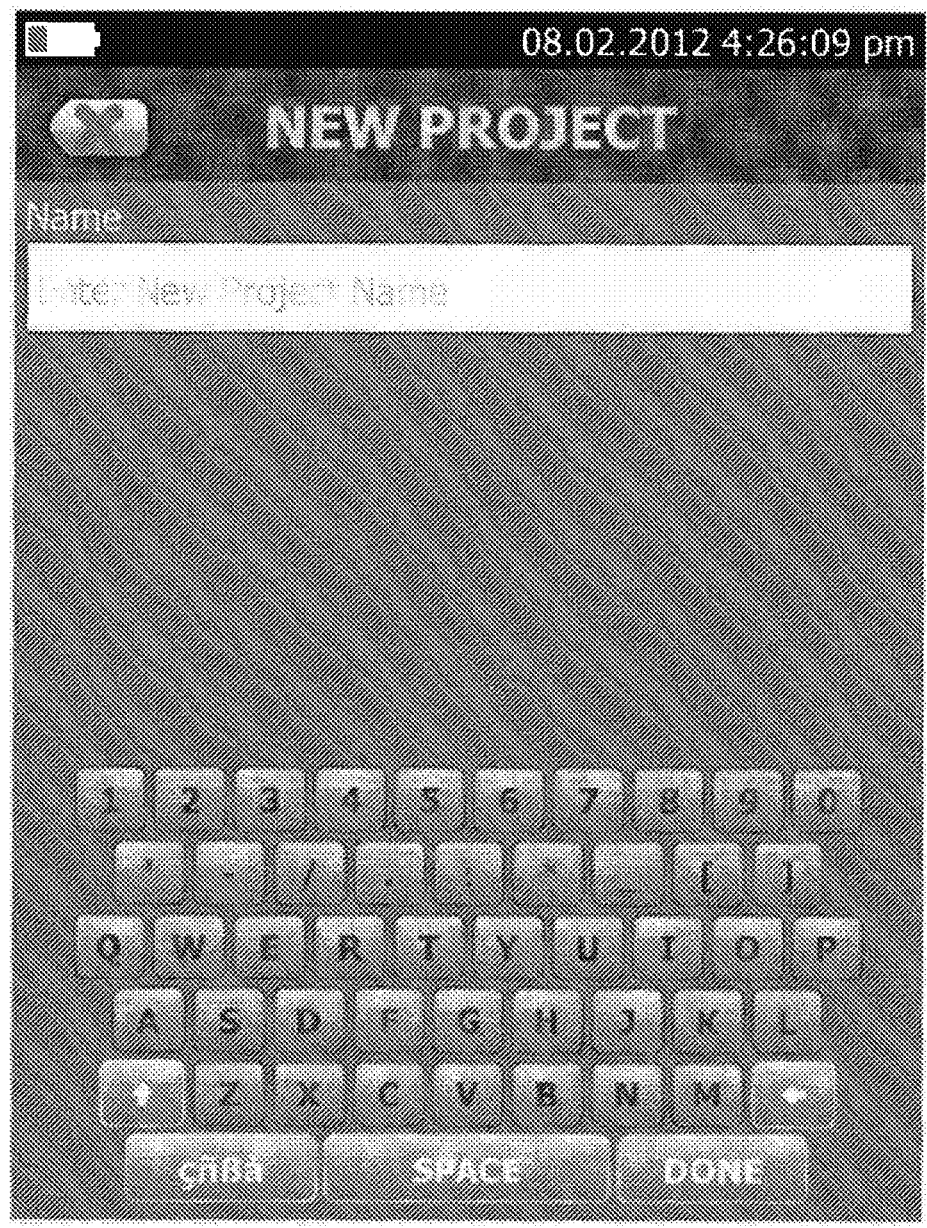
FIG. 31 is view of a particular display for entering new project information.

Referring to FIGS. 10-12, views of screens related to the project icon, selecting the icon in FIG. 9 allows access to project management screens, such as the New Project screen shown in FIG. 31, which allows entry of project name, with a touch screen keyboard provided. FIG. 10 illustrates a project screen for a project that has already been set up, with project name displayed (TESTING 123) and operator name. A date range over which test results have been obtained is displayed at 44, current number of pass/fail test results at 46, a test setup display at 48 illustrating multiple possible tests that are performed (FaultMap/OM3 Multimode 50 at 50, Auto OTDR/OM3 Multimode 50/ANSI/TIA-568-C at 52, additional tests 54 continue on, which may be scrolled into view by the operator).

A new test 'button' 56 is provided whereby an operator can set up new test parameters and functions to be performed, other than the already saved test sets. At the bottom of the screen, CHANGE PROJECT 58, MANAGE 60 and DONE 62 (the suggested next step) are provided.

FIG. 11 illustrates the CHANGE PROJECT menu, wherein an exit/go back button 64 operates to return to the previous screen, and the various saved projects are displayed at 66, 66', etc., which may be scrolled by the technician using one instrument to select the desired project, or, by selection of button 68, a new project may be entered and set up.

FIG. 12 illustrates the manage project mode reached by selection of button 60 in the view of FIG. 10, wherein Rename 70, Copy 72 or Delete 74 functions are available to provide new name to a project, to copy the particular settings of a project for use in creating a new project, or for deleting the project and test results of that project. At 76 and 78, configuration information is provided for the project, such as 6 test setups and 5 cable ID sets, and a percentage of project completion is displayed at 80 and percentage of project uploaded at 82, which may indicate what amount of project results have been uploaded to a reporting system, for example.

Figure 13:
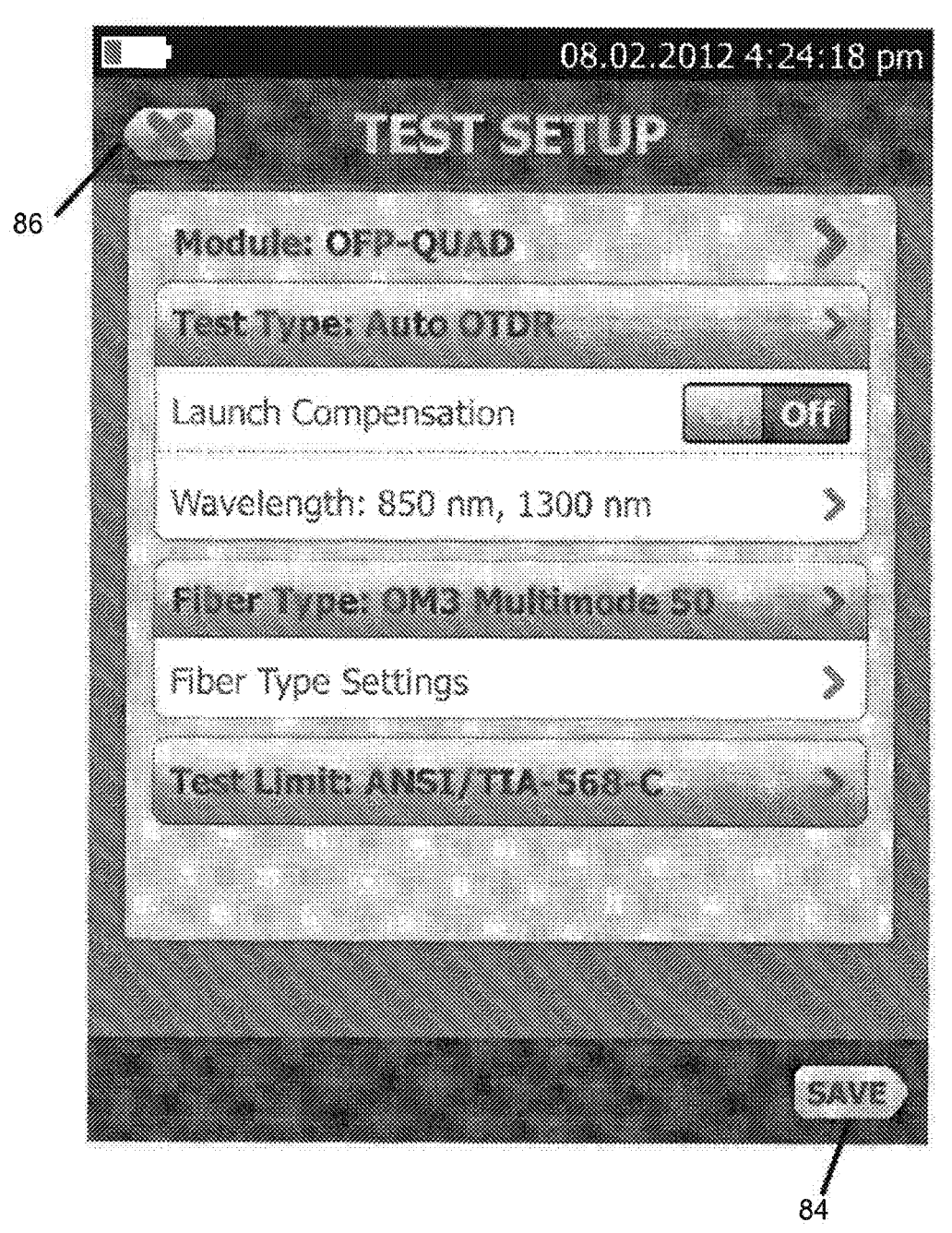
Figure 14:
FIG. 14 is a 'test type' page display.

FIG. 13 illustrates a test setup screen wherein details of a particular test to be performed may be set, with such options as test type (FIG. 14 illustrates a test type sub-screen that illustrates 5 exemplary test types that may be selected in a particular embodiment, comprising Auto OTDR, Manual OTDR DataCenter OTDR, FaultMap and FiberInspector). Other options that may be set in FIG. 13, include launch compensation (On/Off), wavelength, fiber type and test limit. A save button is the suggested next step 84 to be taken in this screen, while a 'back' function 86 is provided to return to a previous screen.

Figure 15:
FIGS. 15 and 16 are tools setting page displays.
Figure 16:
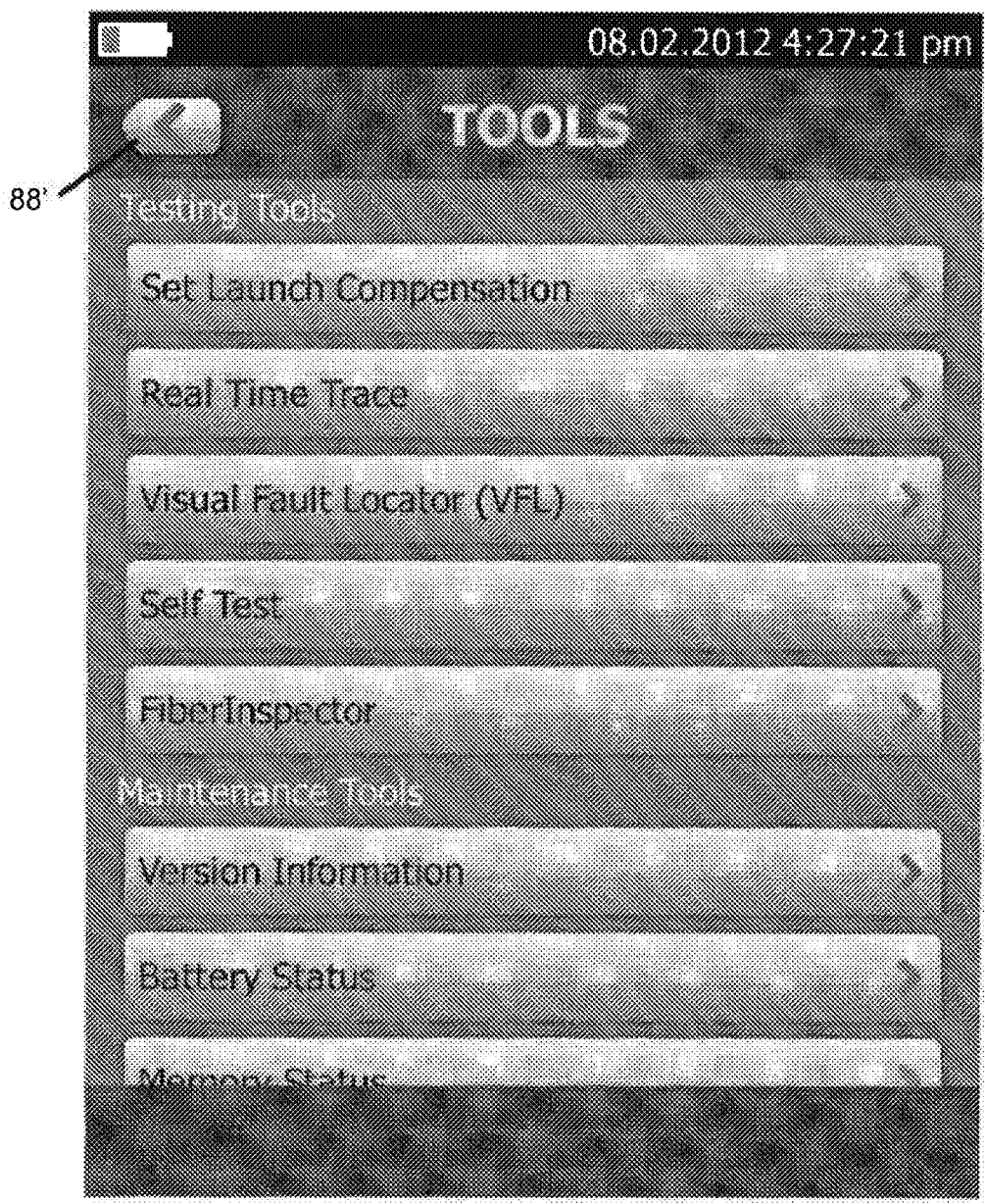
Figure 17:
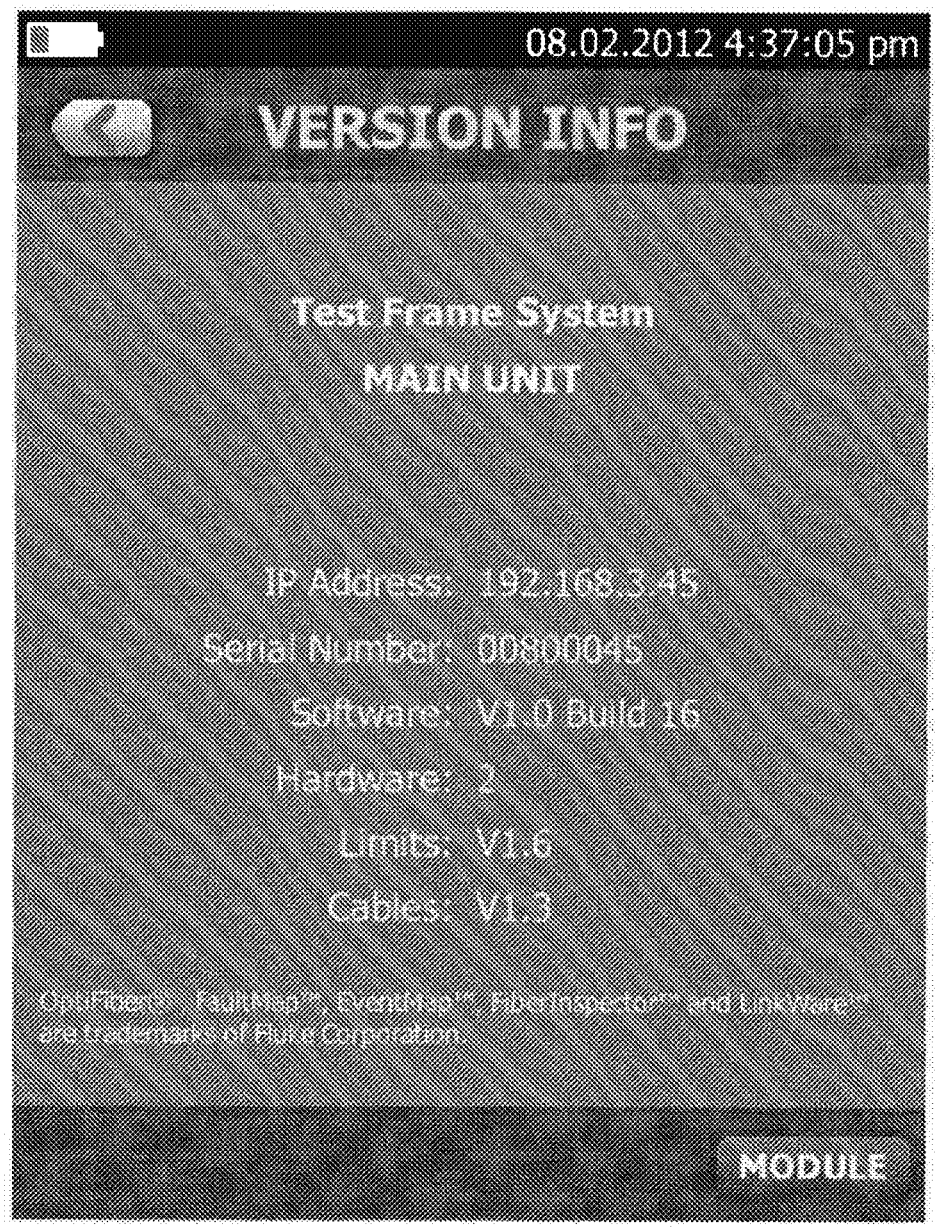
FIG. 17 is a version information display page.

FIGS. 15-17 illustrate TOOLS screens, wherein various operational options may be set, such as, in FIG. 15, language used by the display menus, date/time, number formats (whether decimal point is a period or comma), length values (feet or meters), timeout period, whether to use audible tones, power line frequency (50 Hz/60 Hz) and display variables. A back button 88 is provided to return to a previous screen.

Figure 18:
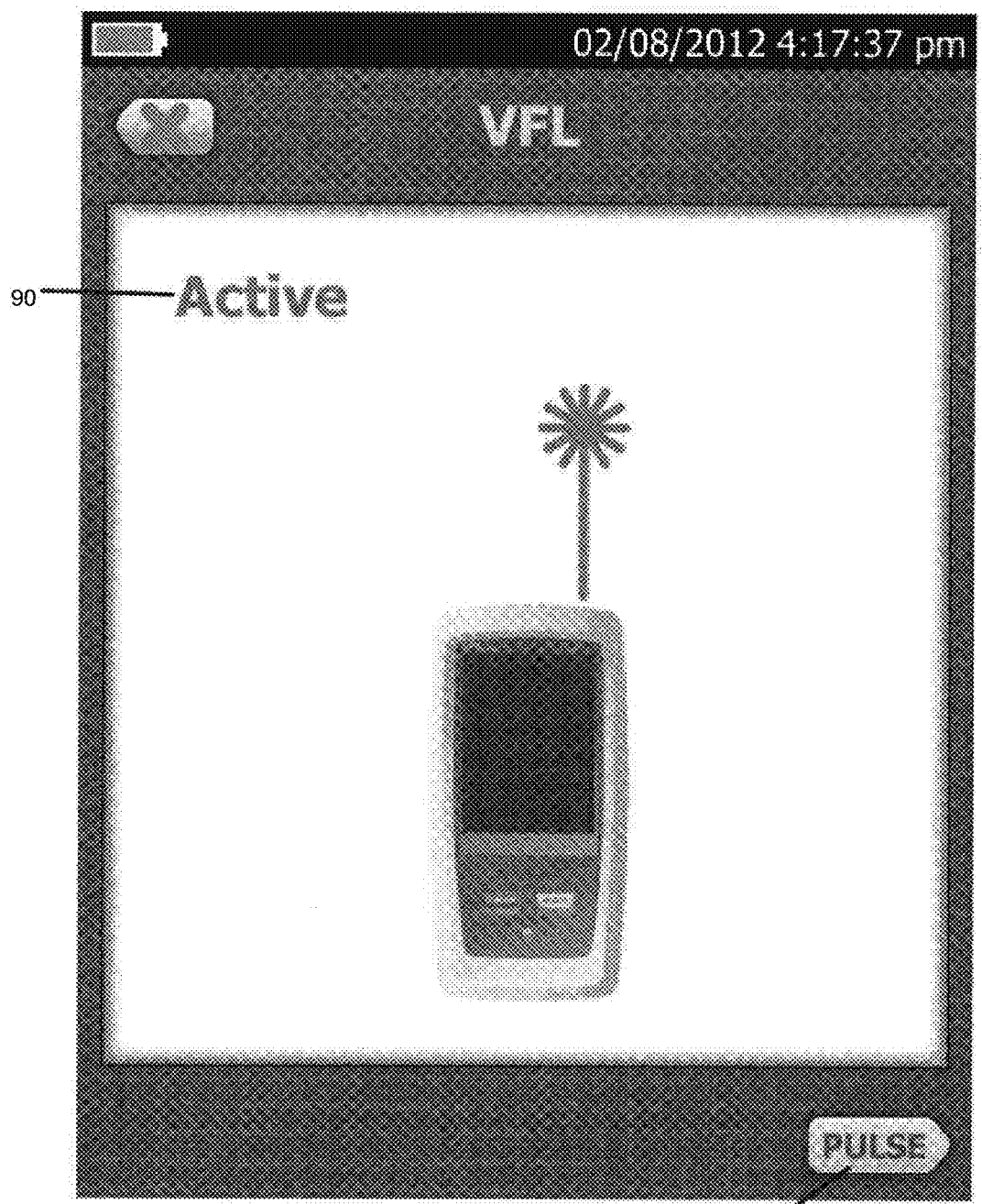
FIG. 18 is an example display resulting from selection of the visual fault locator test option.

FIG. 16 illustrates additional setup tools, such as setting the launch compensation, real time trace value setting, visual fault locator settings, self test function, FiberInspector functions settings. Additional maintenance tools such as version information, battery status and memory status are provided. FIG. 17 illustrates an example display resulting from selection of the version information option. FIG. 18 illustrates an example display resulting from selection of the visual fault locator, wherein the test instrument emits a bright beam of red light easily visible from a distance, which is helpful when trying to trace one of many fibers either in a cable or terminated in a rack, performing simple end-to-end continuity checks and verifying the proper polarity and orientation of fibers within a multi-fiber connector. A status display 90 (ACTIVE) is provided together with a visual representation of the test instrument. Pulse button 92 is provided to allow the technician, to activate a pulsed visual beam.

FIGS. 19-25 illustrate screens displayed during testing.

Figure 19:
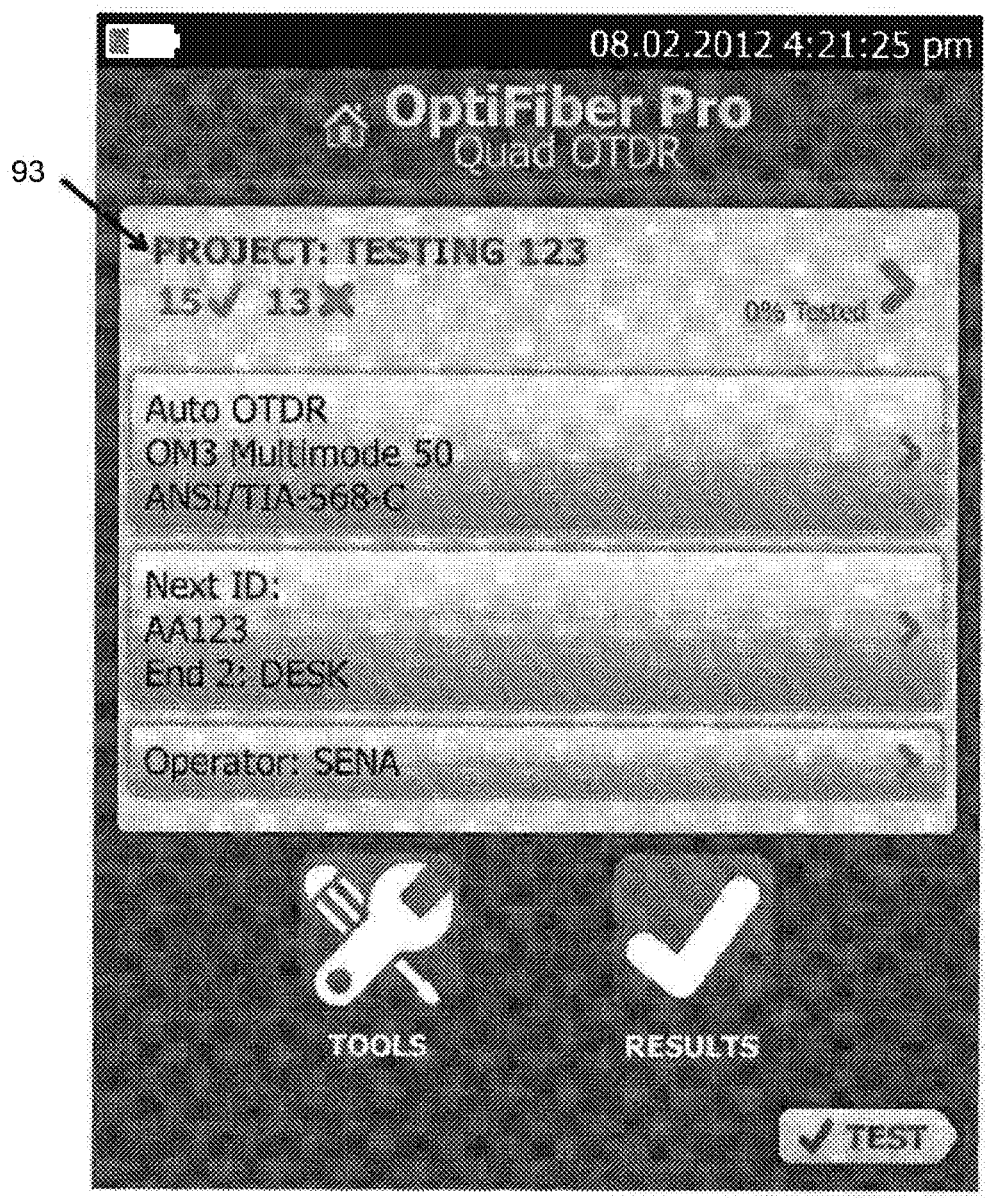
FIGS. 19-25 illustrate screens displayed during testing.

FIG. 19 is a view of an alternative 'home' screen to that of FIG. 9, in a preferred embodiment, wherein a particular selected testing project named TESTING 123 is illustrated. In this embodiment, in place of having project icon 32 of FIG. 9, the project selection function may be chosen by selecting the screen in an area 93 where the current project is displayed, which will operate to transfer to a project selection screen (for example, the screen of FIG. 10). In this view, 15 cables have passed testing while 13 have failed. The testing being performed is Auto OTDR on an OM3 Multimode 50 micron cable, testing to ANSI/TIA-568-C standards. Next ID is blank, while the currently being tested cable ID is AA123, End 2 is indicated to be DESK. An operator's name is shown (Sena). Tools and Results icons are available for selection, while the next suggested operation is "TEST".

Figure 20:
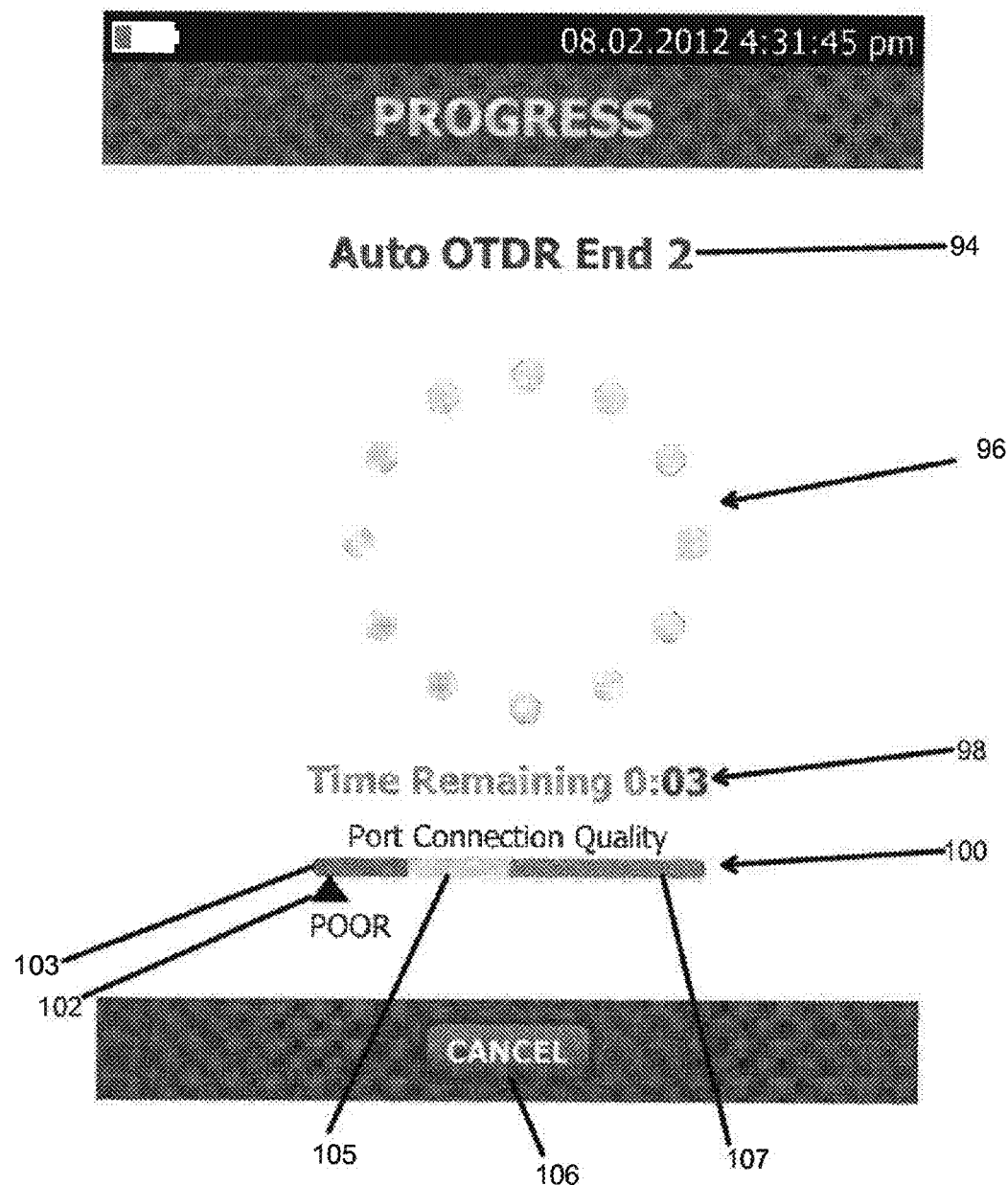

FIG. 20 snows a testing progress screen, wherein the test type is displayed at 94 (Auto OTDR of End 2 of the cable), a graphic display 96 in the form of 12 small circles arranged regularly in the form of a circle, wherein the circles are successively highlighted, or changed color to illustrate the passage of time during the testing activity, a time remaining field 98 provides an indication of the remaining time in the particular test underway, and a Port Connection Quality field 100 shows both graphically in the form of a horizontal bar having multiple color region 103, 105 and 107 and an arrow 102 that moves along the length of the horizontal bar, the leftmost position representing the lowest quality performance and the rightmost position representing the highest quality performance. The word POOR 104 is displayed as the particular illustrated test result is of poor quality at this point in the test. The colors 103, 105 and 107 represent poor, marginal and good test results, and may comprise red, yellow and green, for example. A cancel button 106 is provided to allow the technician to cancel the test before it has completed.

Figure 21:
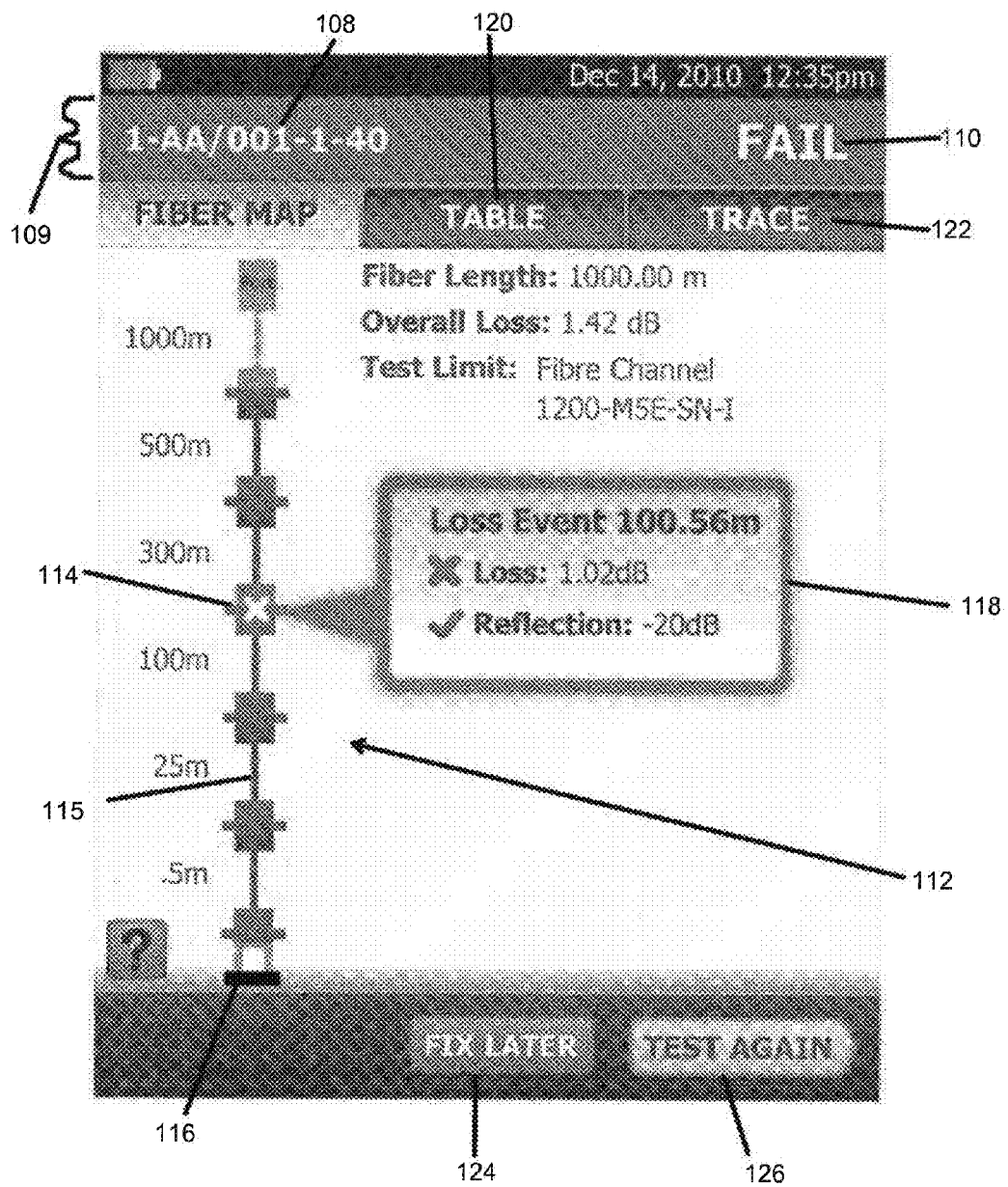

FIG. 21 illustrates an example display in the case where a FAIL condition has been detected. The identifier of the particular cable being tested is displayed at 108, as well as the word FAIL at 110, suitably set in a colored bar 109 of a color representing failure, such as red. A representative map 112 of the cable under test is shown, a fiber optic cable in the illustrated example, with length values and an indicator 114 of the location of the failure event, in the form, of a box with an X. The test instrument itself is represented at 116. Next to the failure indicator box 114 is an annunciator box 118 that denotes a loss event is detected at 100.56 meters from the test instrument, the loss value is displayed. (1.02 db) as well as a reflection value (−20 dB). Also shown is the measured value of fiber length (1000.00 meters), the overall lost (1.42 dB) and the test limit (Fibre Channel 1200-M5E-SN-I). Additional display options other than the fiber map shown are, table 120 or trace 122, which display the test results in other formats, shown in FIGS. 23 and 24, selected by touching the box containing the words TABLE or TRACE (as is selected the FIBER MAP option displayed in FIG. 21).

In the view of FIG. 21, distance values are displayed, representing the distance from the test instrument to the various located events, which in the illustrated display are connectors along the cable under test. In the particular display connectors are located at 0.5, 25, 100, 300, 500 and 1000 meters from the test instrument.

Further provided at the bottom of the screen are a 'FIX LATER' button 124, which operates to save the cable identification and test information into a list of items to be addressed later. This function provides an easy way for the technician to defer having to investigate or fix the particular failing test item.

TEST AGAIN button 126 is provided as the suggested next step, again in a suitable color, such as yellow in a particular embodiment.

Figure 22:
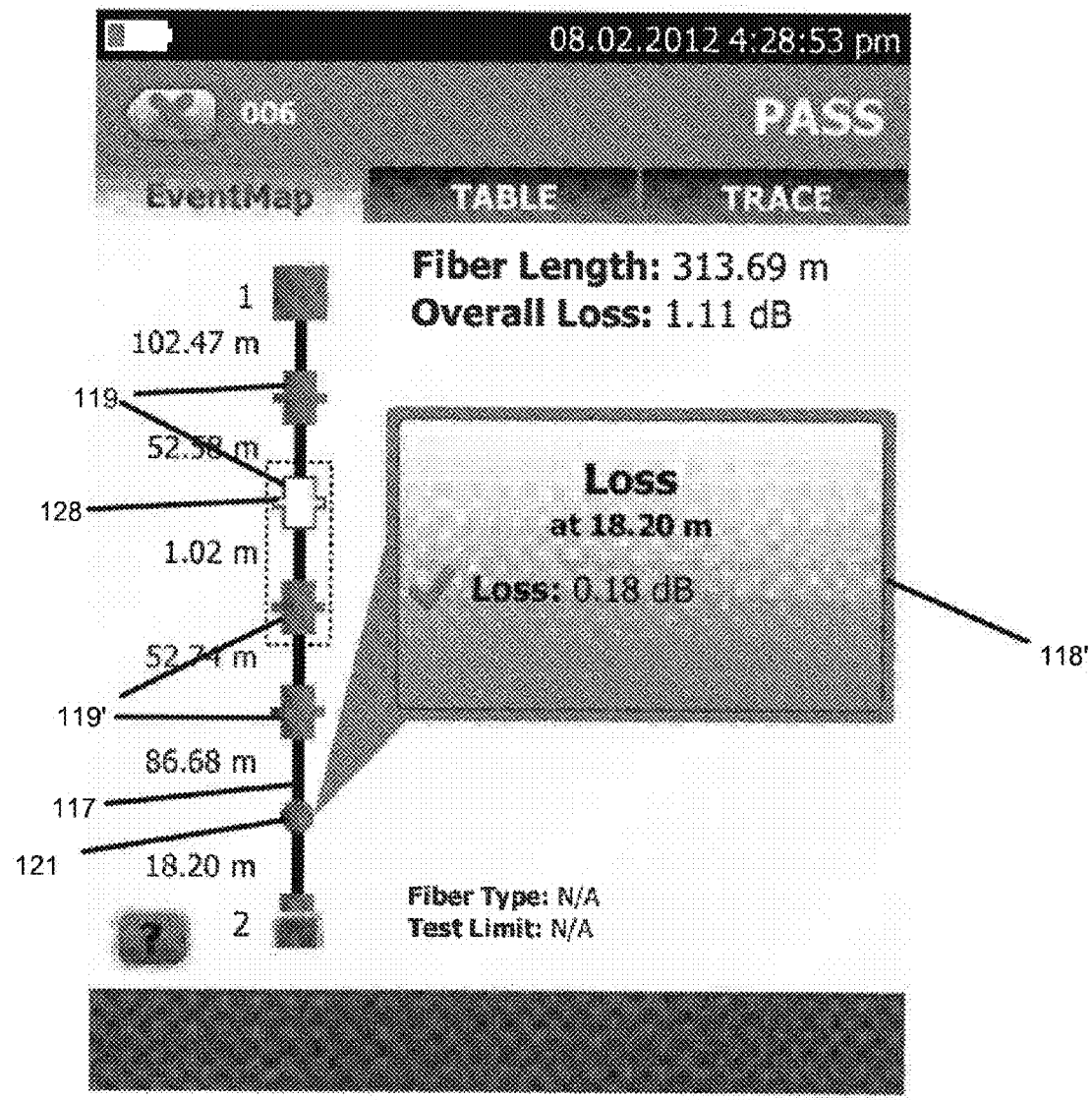

FIG. 22 illustrates an alternative display to that of FIG. 21, wherein the particular display of FIG. 22 is a preferred embodiment screen display option compared for example to the format of FIG. 21. The Fiber Map view of FIG. 21 is called an 'EventMap' view in FIG. 22, this particular view being that of a passed test result, where a loss value of 0.18 dB has been detected at 18.20 meters from the test instrument, this particular test value on a cable identified, as cable 006. A box 128 of a different color than other portions of the representation of the cable is provided to graphically illustrate where the event being displayed is located on the cable.

In the views of FIGS. 21 and 22, the vertical lines provide representations of the cable under test, while the boxes 119, 119', etc. represent cable connectors. Circle 121 represents a loss event that was detected during the test. The displayed measurement values shown at 118, 118' may be displayed, by selecting the individual event or connector, by touching the connector/event on the display, whereupon the test details related to that particular connector or event are displayed as shown in FIGS. 21 and 22. In the case where the cable under best is sufficiently long such that a representation of the entire cable is not displayable on the screen, scrolling buttons are provided to enable scrolling of the display back and forth along the length of the cable, so that all the events and connectors may be observed.

In the view of FIG. 22, distance values are displayed, representing the distance from a particular event or connector to the next event/connector. In the particular display, a first, event is 18.20 meters from the test instrument, with subsequent connectors at 86.68 meters, 52.74 meters thereafter, 1.02 meters thereafter, 52.58 meters thereafter and 102.47 meters thereafter.

Figure 23:
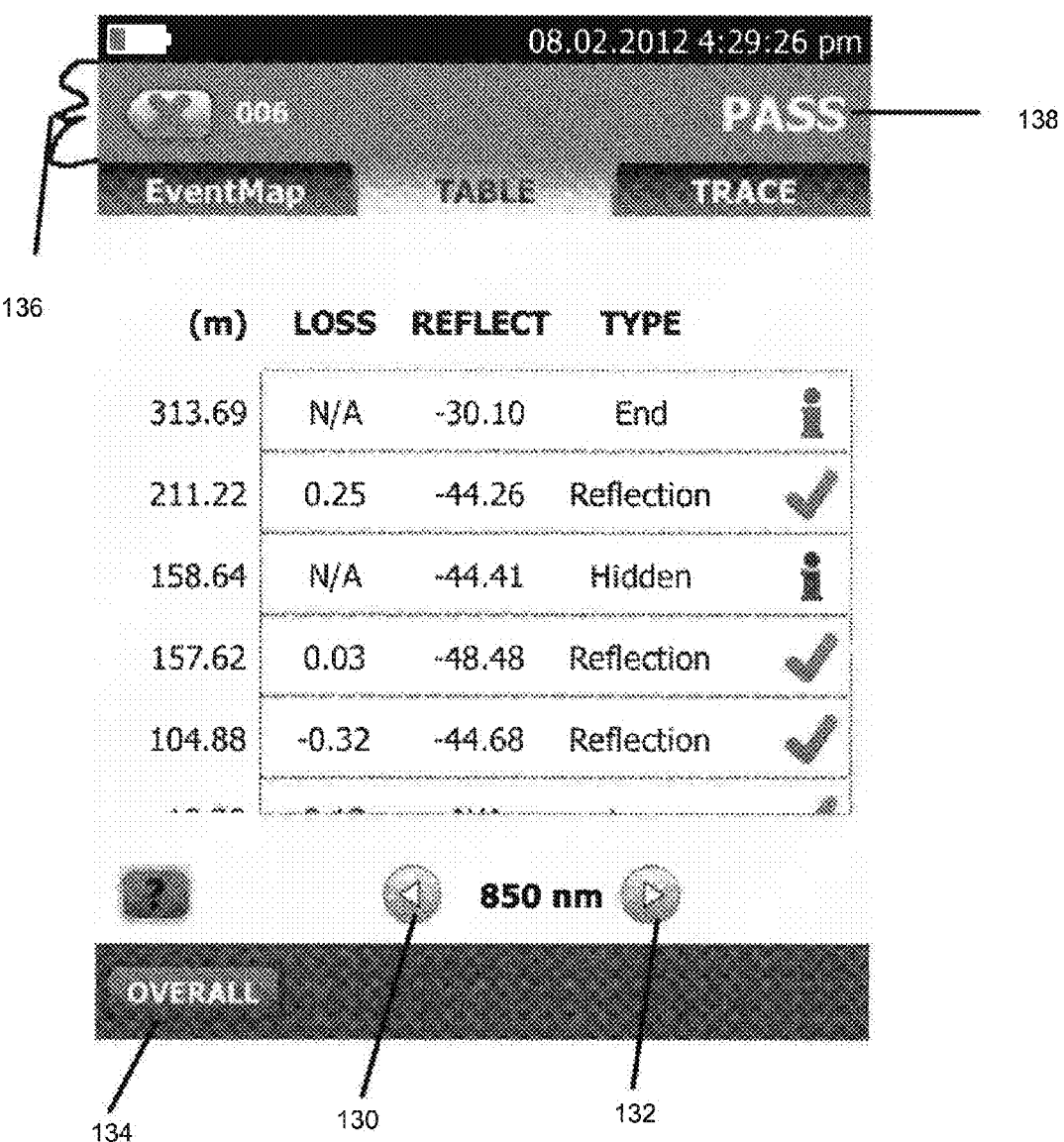

FIG. 23 illustrates a table view of test data for cable 006 of FIG. 22, wherein various values are displayed, of events, such as cable end (at 313.69 meters), reflections (at 211.22, 157.62, 104.88 meters), etc. The displayed tabular data is shown at 850 nm, with buttons 130, 132, provided to allow movement to test data at other frequencies. An OVERALL button 13' is provided to display an overall test result value for the cable, rather than individual event values as shown in FIG. 23. The word PASS 138 appears in a colored bar 136 (suitably green, for example).

Figure 24:
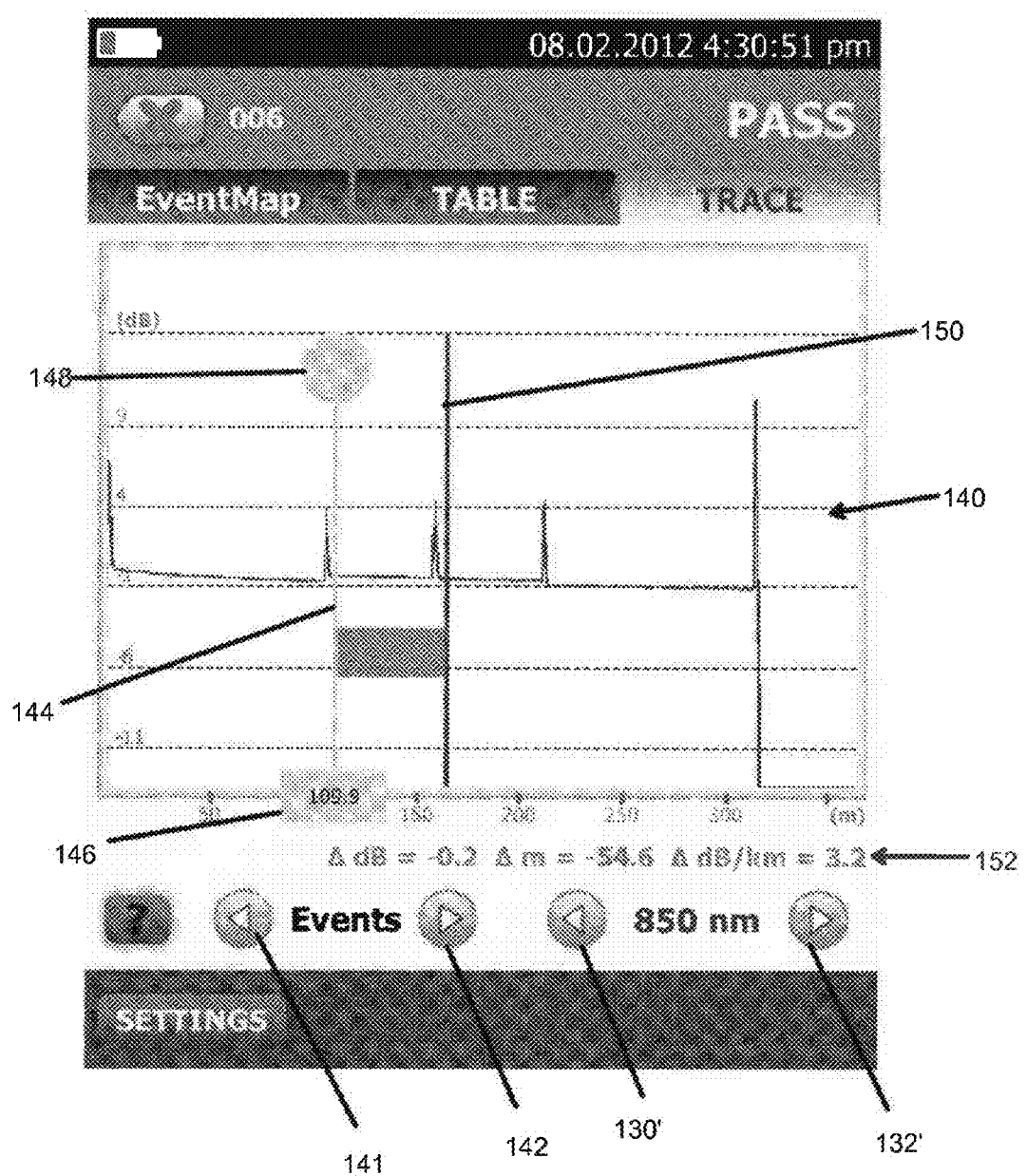

FIG. 24 shows an example of a TRACE display of test results on cable 006, wherein a graphic display 140 providing trace views is provided, along with events movement buttons 141, 142 which allow movement between events that were located during the testing. A cursor 144 is shown placed at 109.9 meters (shown by box 146) with upper highlight 148 on the cursor, and a second cursor 150 is positioned to the right of the first cursor. Measurement values are provided at region 152 comparing the value differences at the respective cursors (e.g., ΔdB--0.2, Δm=54.6, ΔdB/km=3.2).

Figure 25:
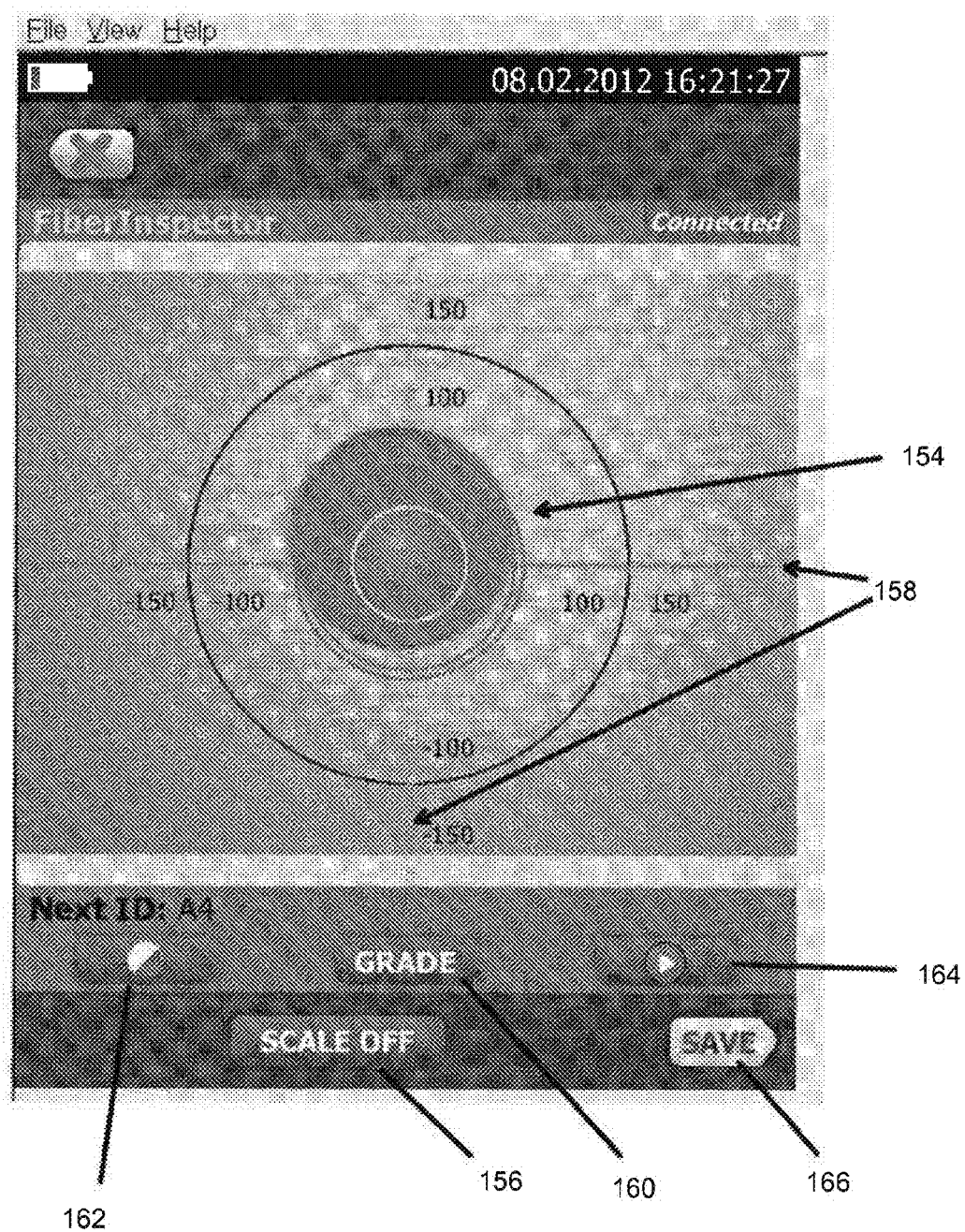

FIG. 25 is a view of a display screen in Fiber Inspector mode, wherein a microscope view of the end of the fiber is displayed in region 154. A 'SCALE OFF' button 156 is provided to turn the scale 158 alternately off or on, as well as a GRADE button 160, a focus button 162 and a next, arrow 164. In this screen, SAVE button 166 is the suggested next step operation button, again presented in a 'suggestion color' such as yellow.

FIGS. 26-30 illustrate viewing results screens and a change ID screen.

Figure 26:
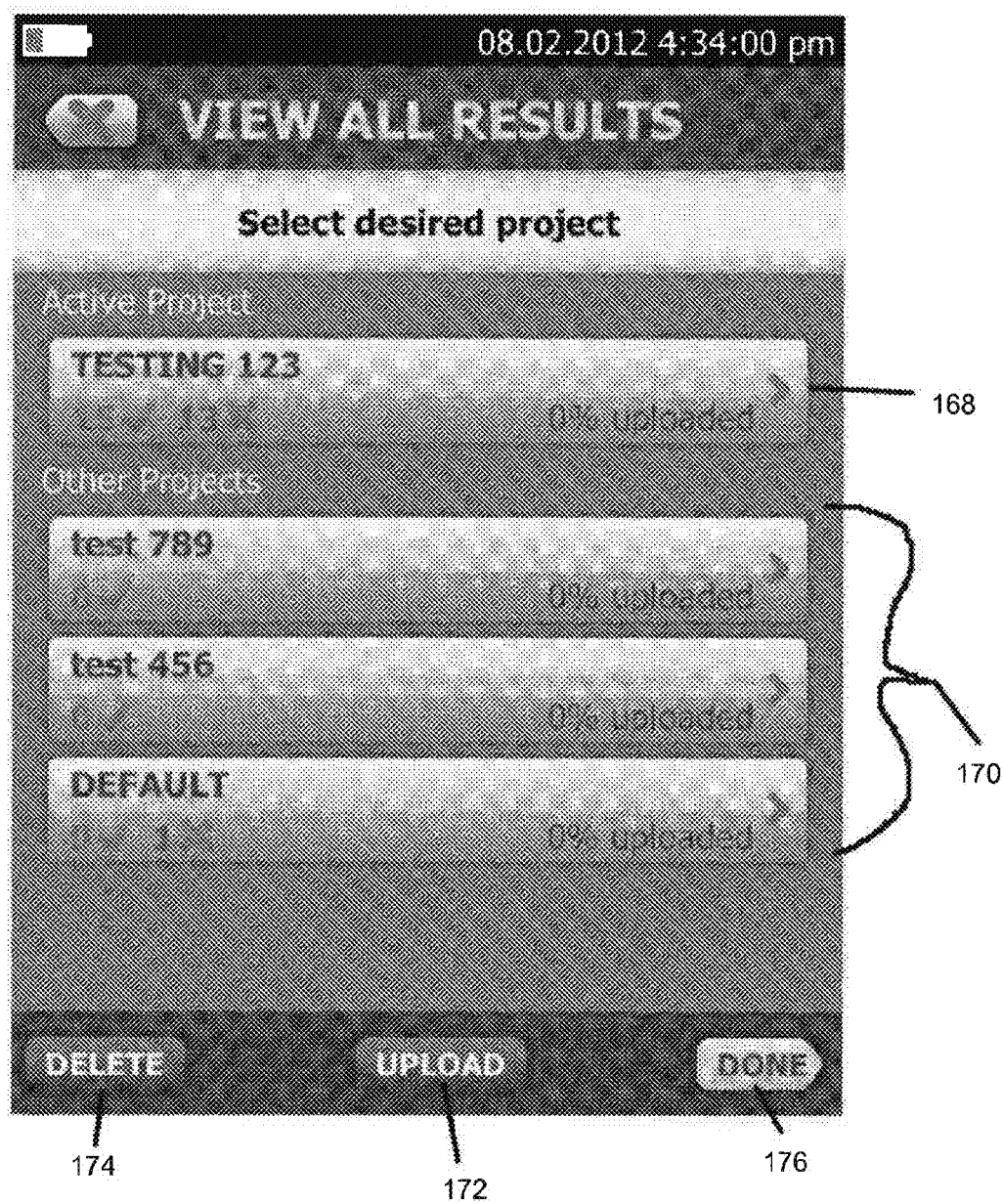
FIGS. 26-29 illustrate viewing results screens.

FIG. 26 shows a view all results screen, wherein an active project region 168 displays a currently active project, and other projects region 170 shows other projects that are stored in the device. A percentage of project uploaded value is displayed, to indicate how much of each project has been uploaded from the instrument to another device or storage. An upload, button 172 is employed to upload a selected project, while a delete button 174 allows a project to be deleted (for example after uploading the project data). A done button 176, which is the suggested next procedure button in this view, is provided.

Figure 27:
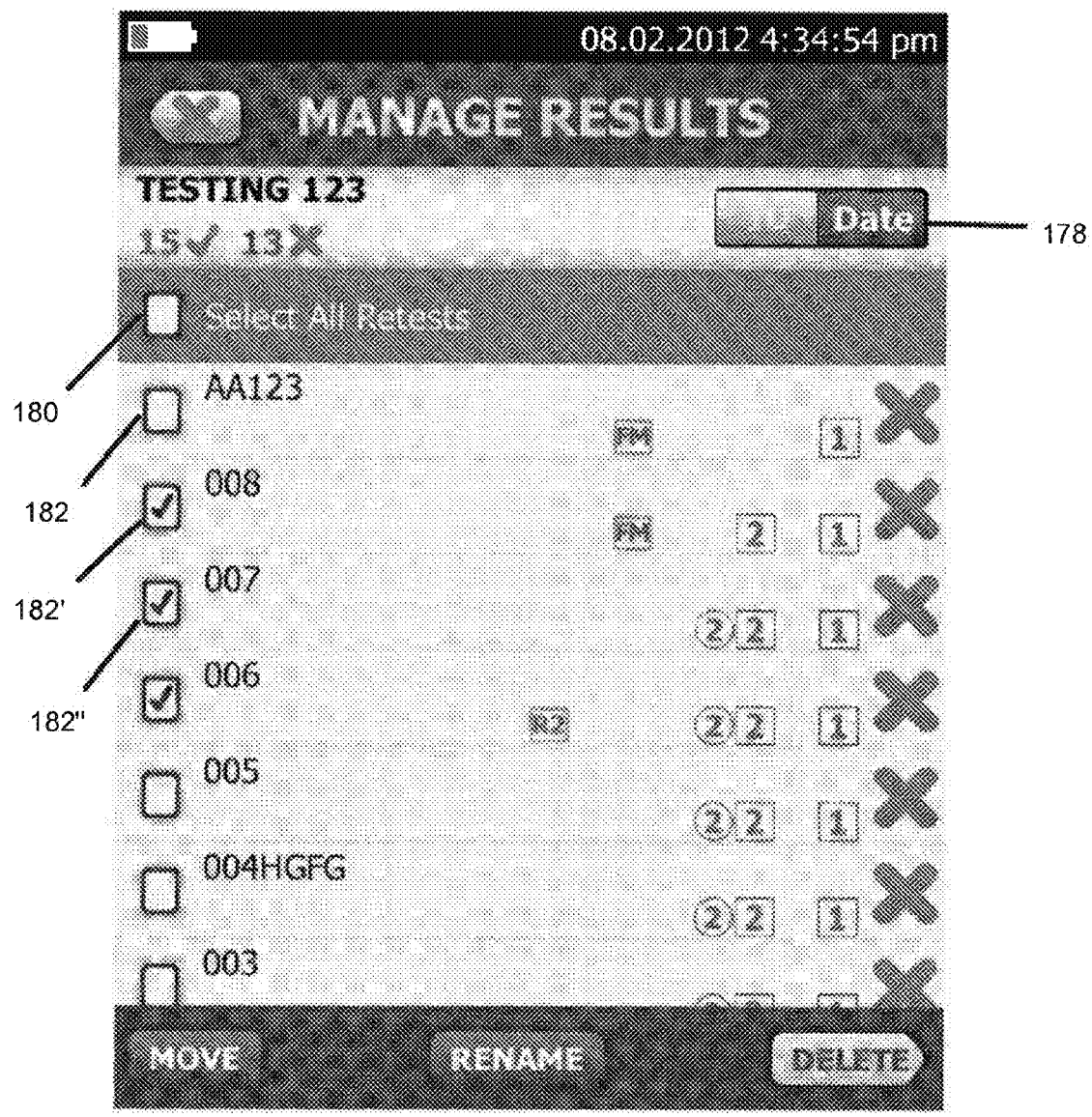

FIG. 27 illustrates a manage results screen wherein results of a testing project may be displayed, sorted by date or identification by selection of ID/DATE field 178. A select all retests check box 180 is available to indicate all items in the list should be retested, or individual check boxes 182, 182', etc. may be selected to select a subset of the items for retesting. Move, rename and delete functions are also available, delete being the suggested next step for this particular state of operation.

Figure 28:
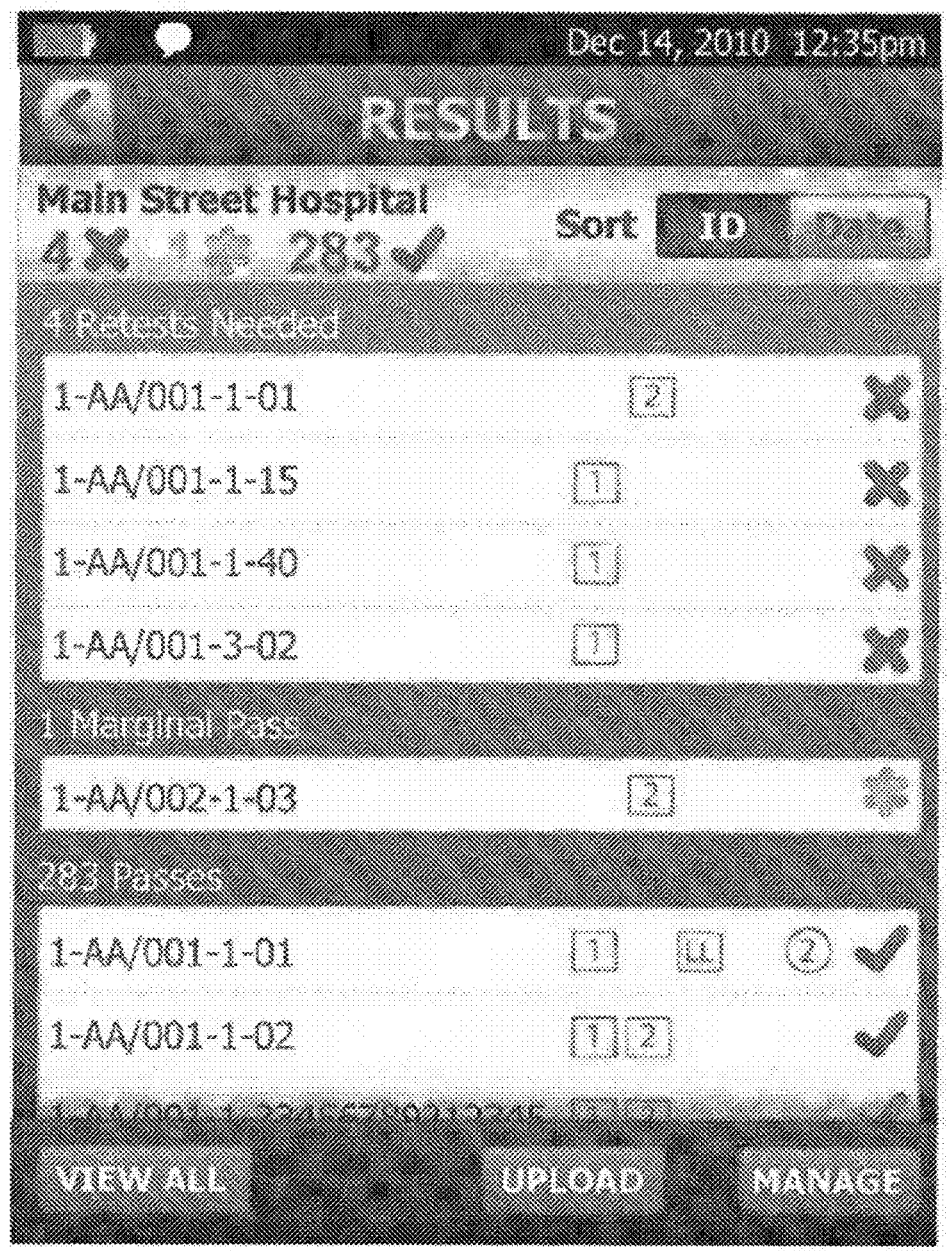

FIG. 28 shows a different results set from a different test named Main Street Hospital, which shows 4 failed tests, 1 marginal and 283 passed tests. The four failed tests are shown at the top of the screen with an indication '4 Retests Needed', followed by the 1 Marginal Pass test result, followed further by the 283 passed test results, which may be scrolled up and down to move into view on the screen as desired. A view all, upload or manage function button may be selected at the bottom of the screen for further operation. No suggested next step option is provided, in this particular screen.

Figure 29:
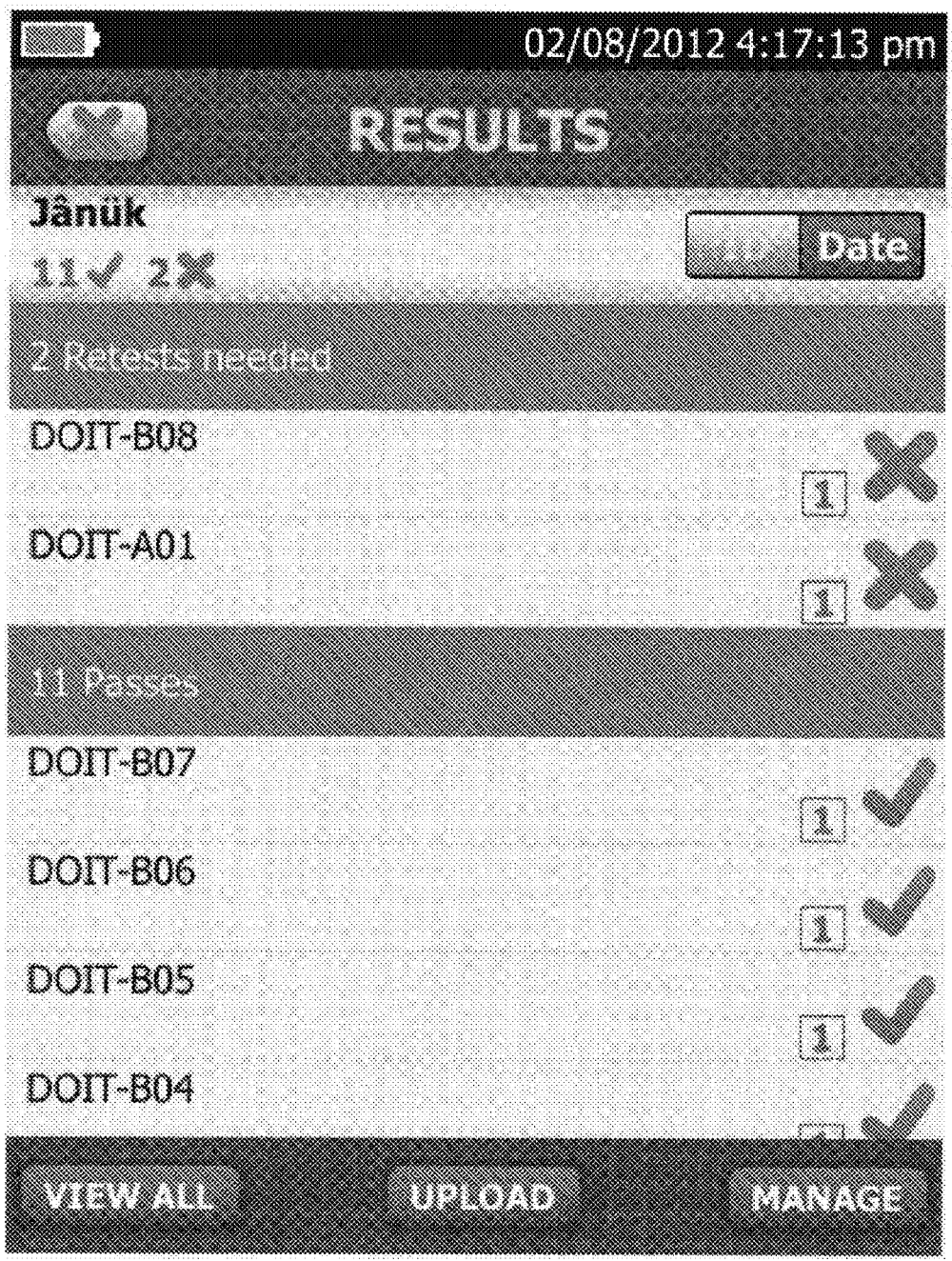

FIG. 29 shows yet another results display for a test set named Jánük, showing 11 passed tests and 2 retests needed. The method and apparatus presents a convenient way to manage retesting, by presenting the items needed retesting in a punch list, allowing the technician to easily determine which items need to be retested and then to accomplish the retesting.

Figure 30:
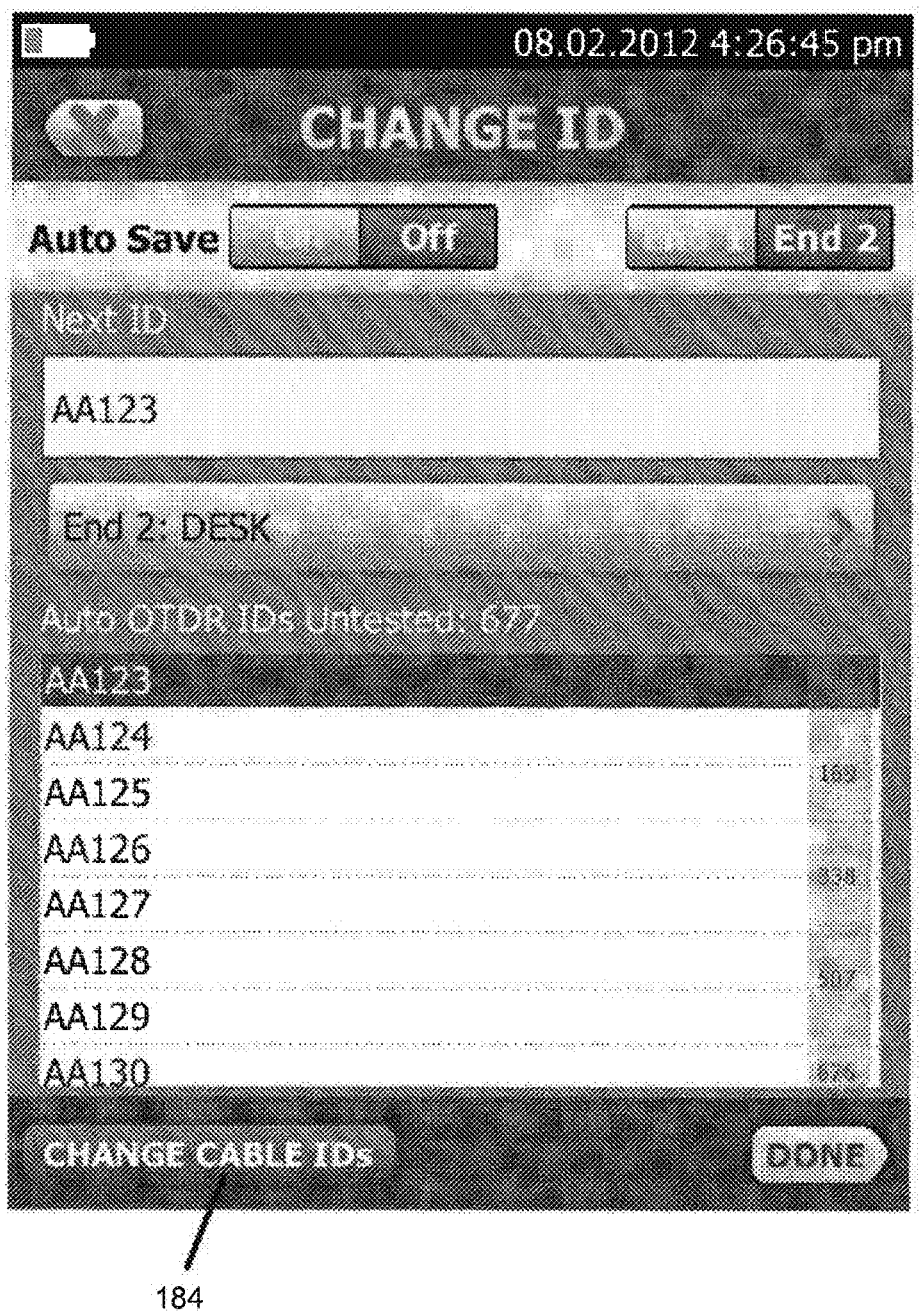
FIG. 30 is a change ID screen.

FIG. 30 illustrates a display screen for a change ID function, wherein the identifier assigned, to any particular cable can be changed, by selection of CHANGE CABLE IDs button 184, which will then present a keyboard display to allow editing of the name of a particular cable identifier. "DONE" is the suggested next step option presented in this particular view.

Figure 1:
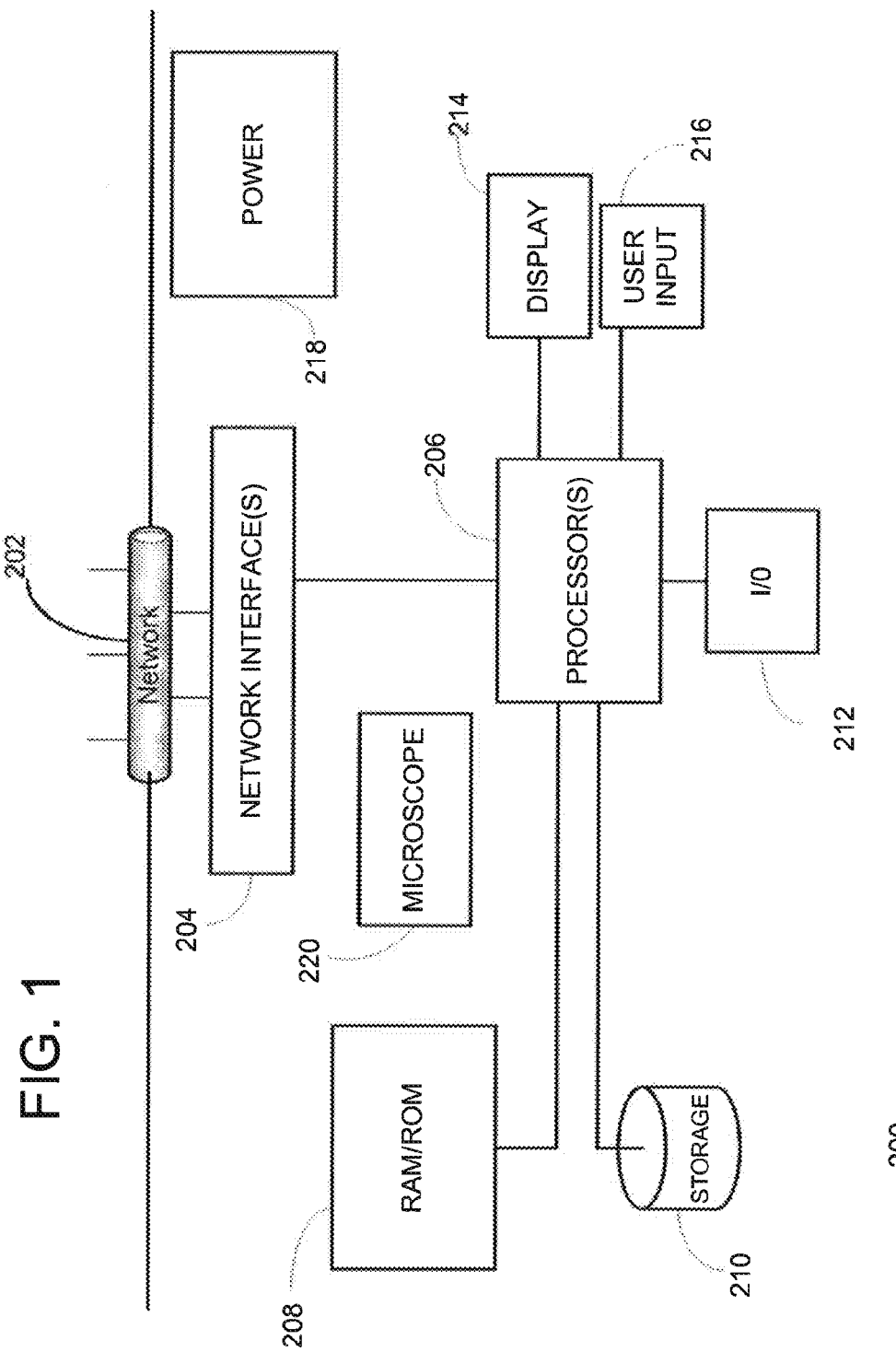
FIG. 1 is a block diagram of a test instrument that embodies the method and apparatus.
Figure 2:
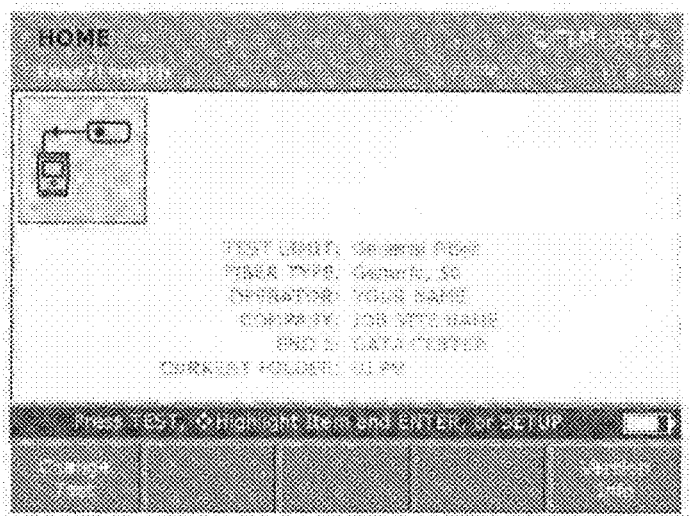
Figure 3:
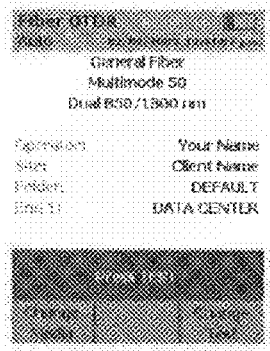
Figure 4:
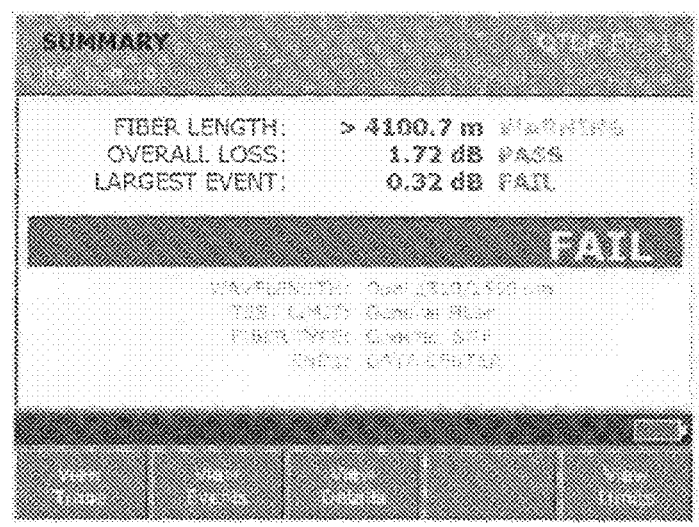
Figure 5:
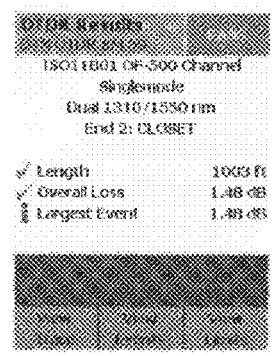
Figure 8:
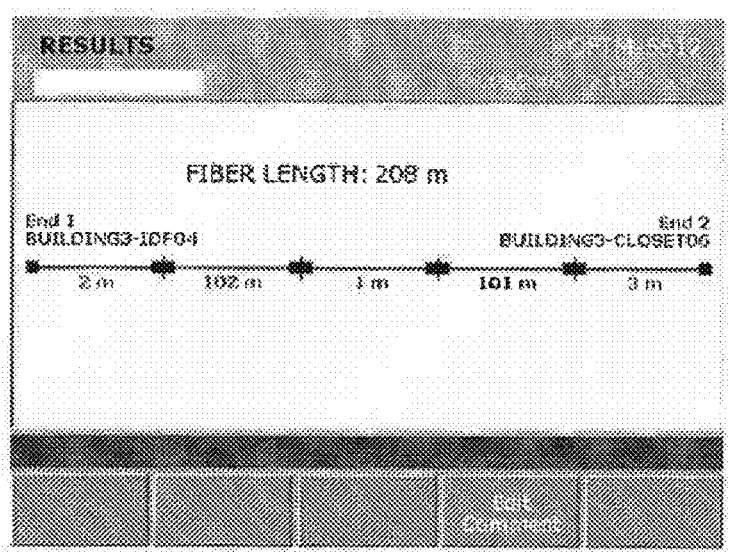

Referring now to FIG. 1, a block diagram of a test instrument, in this particular embodiment, an optical networking test instrument 200, the instrument connects to a network under test 202, an optical, network in a particular embodiment, via network interface(s) 204. The instrument includes processor(s) 206, memory such as RAM/ROM 208, persistent storage 210, I/O 212 which attaches the device to a network or other external devices (storage, other computer, etc.), display 214, user input devices 216 (such as, for example, keyboard, mouse or other pointing devices, touch screen, etc.), power supply 218 which may include battery or AC power supplies. Microscope 220 provides the inspection function to view the end of the fiber in the FiberInspect mode. The processor(s) operate the instrument to provide test and measurement function for the network.

In operation, the network test instrument is attached to the network, and observes transmissions on the network and provides stimulus and response measurement to collect information and statistics and effect testing and measurement.

In accordance with the method and apparatus disclosed herein, an improved test instrument and method are provided, for testing of wired, fiber optic or wireless networks, for example, wherein in a test summary screen, FIX LATER or TEST AGAIN options are provided as possible next steps for the user of the instrument to take. This terminology eliminates the fear of saving a 'failed' result and having to come back to fix it. This eliminates some of the psychological predisposition against saving failed results, while allowing tracking of failure tests, allowing the user's immediate concerns to be addressed, to either fix later, or immediately test again. Further, the provision of a percentage of project completed display on the home screen for example, provides an improvement whereby the amount of a project completed may be easily gauged, for tracking of results. The user instantly knows how much more work is left to do on a particular project. Also, display is provided of the number of passed, failed, or marginally passed test items, to provide an instant view of overall results. Also, on a results display screen, any failed results are moved to the top of the displayed list, providing a 'punch list' of results that need to be addressed. This type of organization eliminates the need for a technician to hunt, through a set of results to find the failed items needing retesting. The provision of a suggested next operational step, suitably in the form of a particular colored or highlighted function button (such as yellow with an arrow appearance to the button at a common screen location, such as the lower right), provides the user with assistance in the form of 'what should I do next' suggestions. Graphical display of the cable under test provides an easy way to view individual results of events or connectors on the cable, by touch selection, of a graphical representation of cable elements or events, and resulting display of the particular test results related, to the selected cable element or event.

While a preferred embodiment of the present invention has been, shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of operating a test instrument having a computer processor coupled to a graphical unit interface (GUI), comprising:

providing, by the computer processor, a test functionality for testing a plurality of network cables, wherein the test functionality is divided into a plurality of testing projects;

providing, by the computer processor, project management functionality for managing status of the plurality of testing projects;

displaying, by the computer processor, on the GUI results of the test functionality for one of the plurality of testing projects performed on the plurality of the tested network cables and simultaneously displaying on the GUI a first plurality of project management GUI control elements providing links to the project management functionality;

displaying, by the computer processor, on the GUI a testing GUI control element accompanying one or more network cables having a failed status, whereby the testing GUI control element displays a next operational step to be performed as determined by the computer processor including at least one of a FIX LATER or TEST AGAIN identifier; and displaying, by the computer processor, on the GUI, responsive to user selecting one of the first plurality of project management GUI controls, a second plurality of project management GUI control elements, wherein the second plurality of project management GUI control elements include at least one of a Rename, Copy and Delete elements, and wherein selection of the Rename GUI control element prompts the user to enter a new name to be associated with the one of the plurality of testing projects, selection of the Copy GUI control element causes the computer processor to copy one or more predefined project settings for the one of the plurality of testing projects to a different testing project and selection of the Delete GUI control element causes the computer processor to delete the results of the test functionality for the one of the plurality of testing projects.

2. The method of operating a test instrument according to claim 1, further comprising saving a marked test result to a list.

3. The method of operating a test instrument according to claim 2, further comprising providing the list to a user for selection of items to retest.

4. The method as recited in claim 1, further including the step of displaying in the GUI failed test results on a top portion of a listing of test results.

5. The method as recited in claim 1, further including the step of displaying in the GUI indication of which end of a network cable was tested.

6. The method as recited in claim 1, wherein the next operational step is retesting the network cable.

7. The method as recited in claim 1, wherein the next operational step is saving test data to memory.

8. The method as recited in claim 1, wherein the next operational step is to designate a failed network cable with a fix later status.

9. The method as recited in claim 1, further including the step of displaying in the GUI indication of an amount of a network test project that has been completed.

10. A test instrument having a computer processor coupled to a graphical unit interface (GUI), comprising:
  a test module for:
    providing test stimulus to and receiving and recording test measurement results from
    one or more network cables under test;
    displaying on the GUI results of the test stimulus for one of a plurality of testing projects performed on the one or more network cables and simultaneously displaying on the GUI a first plurality of project management GUI control elements providing links to project management functionality;
    displaying on the GUI a testing GUI control element accompanying one or more network cables having a failed status pursuant to the provided test stimulus, whereby the testing GUI control element displays a next operational step to be performed including at least one of a FIX LATER or TEST AGAIN identifier;
    displaying on the GUI, responsive to user selecting one of the first plurality of project management GUI controls, a second plurality of project management GUI control elements, wherein the second plurality of project management GUI control elements include at least one of a Rename, Copy and Delete elements, and wherein selection of the Rename GUI control element prompts the user to enter a new name to be associated with the one of the plurality of testing projects, selection of the Copy GUI control element causes the test module to copy one or more predefined project settings for the one of the plurality of testing projects to a different testing project and selection of the Delete GUI control element causes the test module to delete the results of the test stimulus for the one of the plurality of testing projects; and
  a storage medium for storing a list of test results warranting retesting.

11. The test instrument according to claim 10, further comprising a fix later function operative to store a test item into the list of test results warranting retesting.

12. The test instrument according to claim 10 further comprising a display for displaying the list of test results warranting retesting.

13. The test instrument according to claim 12, further comprising selection means for enabling selection of items from the list of test results warranting retesting.

14. The test instrument as recited in claim 10, wherein the test module further causes displaying in the GUI failed test results on a top portion of a listing of test results.

15. The test instrument as recited in claim 10, wherein the test module further causes displaying in the GUI indication of which end of a network cable was tested.

16. The test instrument as recited in claim 10, wherein the next operational step is retesting the network cable.

17. The test instrument as recited in claim 10, wherein the next operational step is saving test data to memory.

18. The test instrument as recited in claim 10, wherein the next operational step is to designate a failed network cable with a fix later status.

19. The test instrument as recited in claim 10, wherein the test module further causes displaying in the GUI indication of an amount of a network test project that has been completed.

* * * * *